(12) United States Patent
Park et al.

(10) Patent No.: US 9,059,631 B2
(45) Date of Patent: Jun. 16, 2015

(54) APPARATUS AND METHOD FOR PROTECTING SUPPLY MODULATOR

(71) Applicant: Samsung Electronics Co. Ltd., Suwon-si, Gyeonggi-do (KR)

(72) Inventors: Bok-Ju Park, Suwon-si (KR); Hee-Sang Noh, Yongin-si (KR); Hyung-Sun Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 292 days.

(21) Appl. No.: 13/651,725

(22) Filed: Oct. 15, 2012

(65) Prior Publication Data

US 2013/0093404 A1  Apr. 18, 2013

(30) Foreign Application Priority Data

Oct. 14, 2011  (KR) .................. 10-2011-0105565

(51) Int. Cl.
  *G05F 1/569*  (2006.01)
  *H02M 3/158*  (2006.01)
  *H02M 1/32*  (2007.01)
  *H02M 1/00*  (2006.01)
  *H02M 3/156*  (2006.01)

(52) U.S. Cl.
  CPC .............. *H02M 3/158* (2013.01); *H02M 1/32* (2013.01); *H02M 2001/0045* (2013.01); *H02M 2003/1566* (2013.01)

(58) Field of Classification Search
  CPC ................................. G05F 1/461; G05F 1/569
  USPC ......... 363/266, 268, 270, 271, 273, 275–277, 363/280, 282, 285; 361/18
  See application file for complete search history.

(56) References Cited

U.S. PATENT DOCUMENTS

| | | | |
|---|---|---|---|
| 6,661,210 B2 * | 12/2003 | Kimball et al. ................ | 323/268 |
| 7,084,612 B2 * | 8/2006 | Zinn .............................. | 323/266 |
| 7,560,912 B2 * | 7/2009 | Xu et al. ........................ | 323/266 |
| 7,602,167 B2 * | 10/2009 | Trafton et al. ................. | 323/284 |
| 7,701,685 B2 | 4/2010 | Leung et al. | |
| 7,880,456 B2 * | 2/2011 | Falvey et al. .................. | 323/284 |
| 2003/0137286 A1 | 7/2003 | Kimball et al. | |
| 2006/0290333 A1 | 12/2006 | Fukushi et al. | |
| 2007/0247126 A1 | 10/2007 | Xu et al. | |

FOREIGN PATENT DOCUMENTS

| | | |
|---|---|---|
| CN | 100 525 031 C | 8/2009 |
| EP | 1 079 507 A1 | 2/2001 |

* cited by examiner

*Primary Examiner* — Matthew Nguyen
(74) *Attorney, Agent, or Firm* — Jefferson IP Law, LLP

(57) ABSTRACT

An apparatus and a method for recognizing an electric over-stress of a hybrid supply modulator including a linear regulator and an Switching Mode Power Supplier (SMPS), and protecting a network from the electric over-stress are provided. The hybrid supply modulator includes at least one sensing unit and at least one actuator unit. The at least one sensing unit senses at least one of a current and a voltage at one or more points defined in advance within a supply modulator network. The at least one actuator unit performs a protection action corresponding to at least one electric over-stress situation represented by the sensing result.

36 Claims, 16 Drawing Sheets

APPARATUS AND METHOD FOR PROTECTING SUPPLY MODULATOR

PRIORITY

This application claims the benefit under 35 U.S.C. §119(a) of a Korean patent application filed on Oct. 14, 2011 in the Korean Intellectual Property Office and assigned Serial No. 10-2011-0105565, the entire disclosure of which is hereby incorporated by reference.

BACKGROUND OF THE INVENTION

1. Field of the Invention

The present invention relates to a supply modulator.

2. Description of the Related Art

A supply modulator is a device for modulating Direct Current (DC) power to supply Alternating Current (AC) power that changes in accordance with an input signal to a load. The supply modulator is primarily utilized in a mobile communication terminal for converting an input baseband signal to an output Radio Frequency (RF) signal at high efficiency using limited battery power. To meet performance requirements that are increasingly difficult to attain, such as a broadband trend of a process signal, a high Peak to Average Power Ratio (PAPR), etc., the supply modulator utilized in the mobile communication terminal is evolving so as to be implemented by a more efficient structure. In the related art, a supply modulator that independently applies a linear regulator or a Switching Mode Power Supplier (SMPS) technology primarily utilized as a DC-DC converter in a power Integrated Circuit (IC) field has been realized. However, to address a technical limitation, a supply modulator of a hybrid structure including both the linear regulator and the SMPS has been suggested.

In a case of a supply modulator including only one of the linear regulator and the SMPS, optimization to tune for a particular system situation is performed. However, despite optimization, similar protection devices in aspects of a structure and concept may be applied to all cases. However, in a case of a hybrid supply modulator where the linear regulator and the SMPS are coupled as core elements, an abnormal situation in which a protection action should be provided will appear in a different form at a point different from a case of a supply modulator including only one of the linear regulator and the SMPS.

Therefore, there is a need for an alternative for recognizing an abnormal situation and performing a protection action in a hybrid supply modulator.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for recognizing an electric over-stress situation of a supply modulator.

Another aspect of the present invention is to provide an apparatus and a method for protecting a network of a supply modulator.

Still another aspect of the present invention is to provide an apparatus and a method for recognizing an electric over-stress situation of a hybrid supply modulator.

Yet another aspect of the present invention is to provide an apparatus and a method for protecting a network of a hybrid supply modulator.

A further aspect of the present invention is to provide an apparatus and a method for recognizing an in-current situation due to power unbalance in a hybrid supply modulator.

A yet further aspect of the present invention is to provide an apparatus and a method for recognizing an over-current situation due to a load short in a hybrid supply modulator.

A still further aspect of the present invention is to provide an apparatus and a method for recognizing an over-current situation due to a load open in a hybrid supply modulator.

Still yet another aspect of the present invention is to provide an apparatus and a method for recognizing an over-voltage situation of an output in a hybrid supply modulator.

In accordance with an aspect of the present invention, a hybrid supply modulator apparatus including a Switching Mode Power Supplier (SMPS) for generating a current of a modulated power signal and a linear regulator for generating a sourcing current for supplementing a shortage amount of a current generated by the SMPS and generating a sinking current for removing an excessive amount of the current is provided. The apparatus includes at least one sensing unit for sensing at least one of a current and a voltage at one or more points defined in advance within a supply modulator network, and at least one actuator unit for performing a protection action corresponding to at least one electric over-stress situation represented by the sensing result, wherein the SMPS includes a driver for controlling at least one switch device depending on an input signal, at least one switch device for controlling an amount of a current under control of the driver, and a filter for filtering a signal passing through the switch device, and wherein the linear regulator includes a first transistor for generating the sourcing current, a second transistor for generating the sinking current, and an amplifier for controlling an amount of a current generated by the first transistor and the second transistor.

In accordance with another aspect of the present invention, a method for operating a hybrid supply modulator including a SMPS for generating a current of a modulated power signal and a linear regulator for generating a sourcing current for supplementing a shortage amount of a current generated by the SMPS and generating a sinking current for removing an excessive amount of the current is provided. The method includes sensing at least one of a current and a voltage at one or more points defined in advance within a supply modulator circuit, and performing a protection action corresponding to at least one electric over-stress situation represented by the sensing result, wherein the SMPS includes a driver for controlling at least one switch device depending on an input signal, at least one switch device for controlling an amount of a current under control of the driver, and a filter for filtering a signal passing through the switch device, and wherein the linear regulator includes a first transistor for generating the sourcing current, a second transistor for generating the sinking current, and an amplifier for controlling an amount of a current generated by the first transistor and the second transistor.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide The present invention relates to recognizing an electric over-stress situation of a supply modulator. Exemplary embodiments of the present invention relate to an apparatus and a method for recognizing an electric over-stress situation in a supply modulator and protecting a network of the supply modulator from the electric over-stress. Exemplary embodiments of the present invention provide a technology for recognizing an electric over-stress of a hybrid supply modulator configured by coupling of a linear regulator and a Switching Mode Power Supplier (SMPS), and protecting a circuit.

Figure 1:
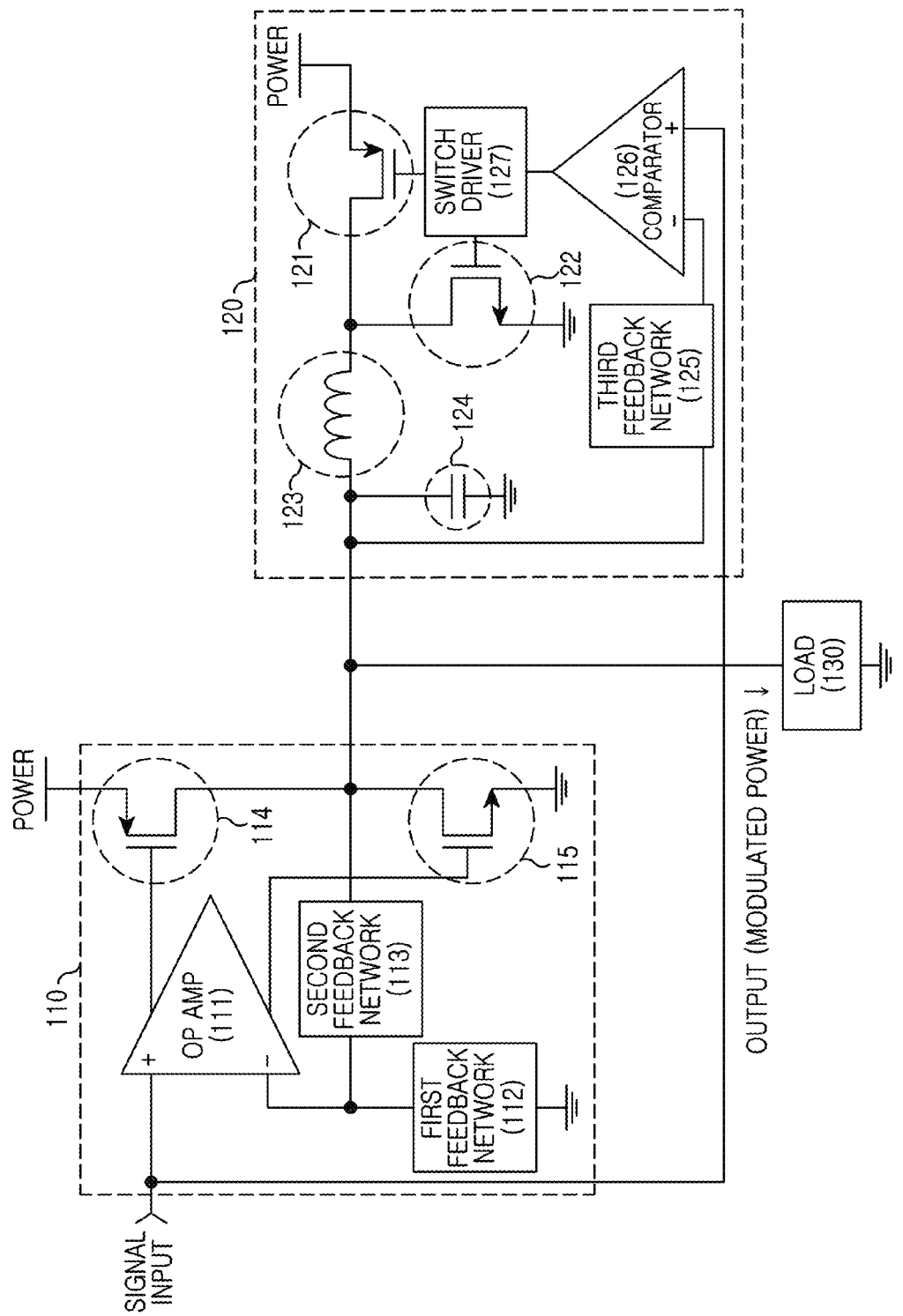
FIG. 1 is a block diagram illustrating a hybrid supply modulator according to an exemplary embodiment of the present invention.

FIG. 1 is a block diagram illustrating a hybrid supply modulator according to an exemplary embodiment of the present invention.

Referring to FIG. 1, the hybrid supply modulator includes a linear regulator core 110 and an SMPS core 120.

Respective outputs of the linear regulator core 110 and the SMPS core 120 are coupled, so that one supply modulator output is generated. Information of a signal input, which is one source, is shared in various ways, so that control information may be configured to control the linear regulator core 110 and the SMPS core 120.

The linear regulator core 110 includes an Operational Amplifier (OP AMP) 111, a first feedback network 112, a second feedback network 113, an upper pass transistor 114, and a lower pass transistor 115. The upper pass transistor 114 is a P-channel Metal-Oxide-Semiconductor (PMOS) transistor. A source is connected to power, a gate is connected to the OP AMP 111, and a drain is connected to an output terminal of the linear regulator core 110. The lower pass transistor 114 is an N-channel Metal-Oxide-Semiconductor (NMOS) transistor. A drain is connected to an output terminal of the linear regulator core 110, a gate is connected to the OP AMP 111, and a source is connected to a ground.

The linear regulator core 110 linearly converts an input voltage signal by regulating an output voltage of pass transistors 114 and 115 via a feedback loop configured with the feedback networks 112 and 113 depending on an input signal input to the OP AMP 111.

The SMPS core 120 includes an upper switch transistor 121, a lower switch transistor 122, an inductor 123, a capacitor 124, a third feedback network 125, a comparator 126, and a switch driver 127. The upper switch transistor 121 is a PMOS transistor. A source is connected to power, a gate is connected to the switch driver 127, and a drain is connected to the inductor 123. The lower switch transistor 122 is an NMOS transistor. A drain is connected to the inductor 123, a gate is connected to the switch driver 127, and a source is connected to the ground.

An output of the SMPS core 120 is scaled by the third feedback network 125, and then provided to the comparator 126. The comparator 126 compares an input signal with the scaled output signal. The switch driver 127 regulates an amount of a current supplied to a load 130 by controlling a switching frequency of the switch transistors 121 and 122 or an on-off duty ratio depending on a comparison result of the comparator 126. Specifically, when the output signal is greater than the input signal, the switch driver 127 turns off the upper switch transistor 121 and turns on the lower switch transistor 122 in order to reduce a current of the output signal. On the contrary, when the output signal is less than the input signal, the switch driver 127 turns on the upper switch transistor 121 and turns off the lower switch transistor 122 in order to increase a current of the output signal. That is, the switch transistors 121 and 122 regulate a current amount of the output signal under the control of the switch driver 127. At this point, a Pulse Frequency Modulation (PFM) signal or a Pulse Width Modulation (PWM) signal is generated by the switch transistors 121 and 122. A signal supplied to the load 130 via the switch transistors 121 and 122 is filtered by a Low Pass Filter (LPF) configured with the inductor 123 and the capacitor 124 connected to an output terminal. A final output current of the SMPS core 120 is regulated via the filtering such that the final output current resembles an input voltage signal. That is, most of a current required by the load 130 is supplied in response to an output voltage waveform of the SMPS core 120.

In the case where the hybrid supply modulator performs supply modulation using an input broadband signal including a high frequency component, the SMPS core 120 cannot swiftly supply a high frequency component due to a narrow-band characteristic generated by a switching operation of the SMPS core 120 and the filtering. In other words, an output current of the SMPS core 120 slowly changes relatively. Therefore, a portion of a current for the load 130 may not be supplied. The high frequency component, which is the unsupplied portion, is supplemented by an output of the linear regulator core 110. That is, a current supplement component output by the linear regulator core 110 is added to a low frequency bulk current output from the SMPS core 120, and as a result, the final output current of the supply modulator is generated.

Furthermore, the low frequency bulk current output from the SMPS core 120 may be output in a form of exceeding a current for the load 130 as well as in a form of less than the current for the load 130. Therefore, an output of the linear regulator core 110 that supplements the bulk current may source a current supplementing a shortage amount of an output current of the SMPS core 120 and simultaneously sink an excessive portion of the output current of the SMPS core 120 in order to remove the excessive portion of the output current of the SMPS core 120. To perform both the sourcing and the sinking, the linear regulator core 110 has a complementary push-pull structure by including the upper pass transistor 114 and a lower pass transistor 115. That is, the sourcing is performed by a current flowing from the upper pass transistor 114 to an output terminal, and the sinking is performed by a current flowing from the lower pass transistor 115 to the ground. That is, the upper pass transistor 114 generates a sourcing current and the lower pass transistor 115 generates a sinking current. Since an amount of a current flowing through the upper pass transistor 114 and the lower pass transistor 115 is changed by a gate voltage, a current amount of the sourcing and the sinking is regulated by the OP AMP 111 that applies the gate voltage.

An electric over-stress that can be generated in the hybrid supply modulator having the structure of FIG. 1 is as follows. The electric over-stress situations include 1) an in-rush current situation, 2) an over-current situation, 3) an over-voltage situation, 4) an over-temperature, and 5) an under low voltage/high voltage situation of a battery.

The in-rush current situation is described below. The supply modulator outputs modulated AC power depending on a fast varying AC signal input. Therefore, unlike the conventional DC-DC converter, the supply modulator does not require a large-capacity capacitor for DC-voltage regulation of a load transient situation required by the DC-DC converter. Also, to improve a conversion bandwidth, a capacitor disposed at an output terminal is limited to a minimum value. Therefore, in a case of the supply modulator, a phenomenon of an in-rush current to a load capacitor by an equivalent short-circuit during a charge depletion state of a large-capacity load capacitor that frequently occurs in a DC-DC converter upon an initial system start-up is mitigated. However, in the case where powers of different values are provided to the linear regulator and the SMPS, respectively, in the hybrid supply modulator, particularly, in the case where power of the linear regulator is supplied using an output of a step-up DC-DC converter, a new type of an in-current that has not been generated conventionally may occur.

Figure 2:
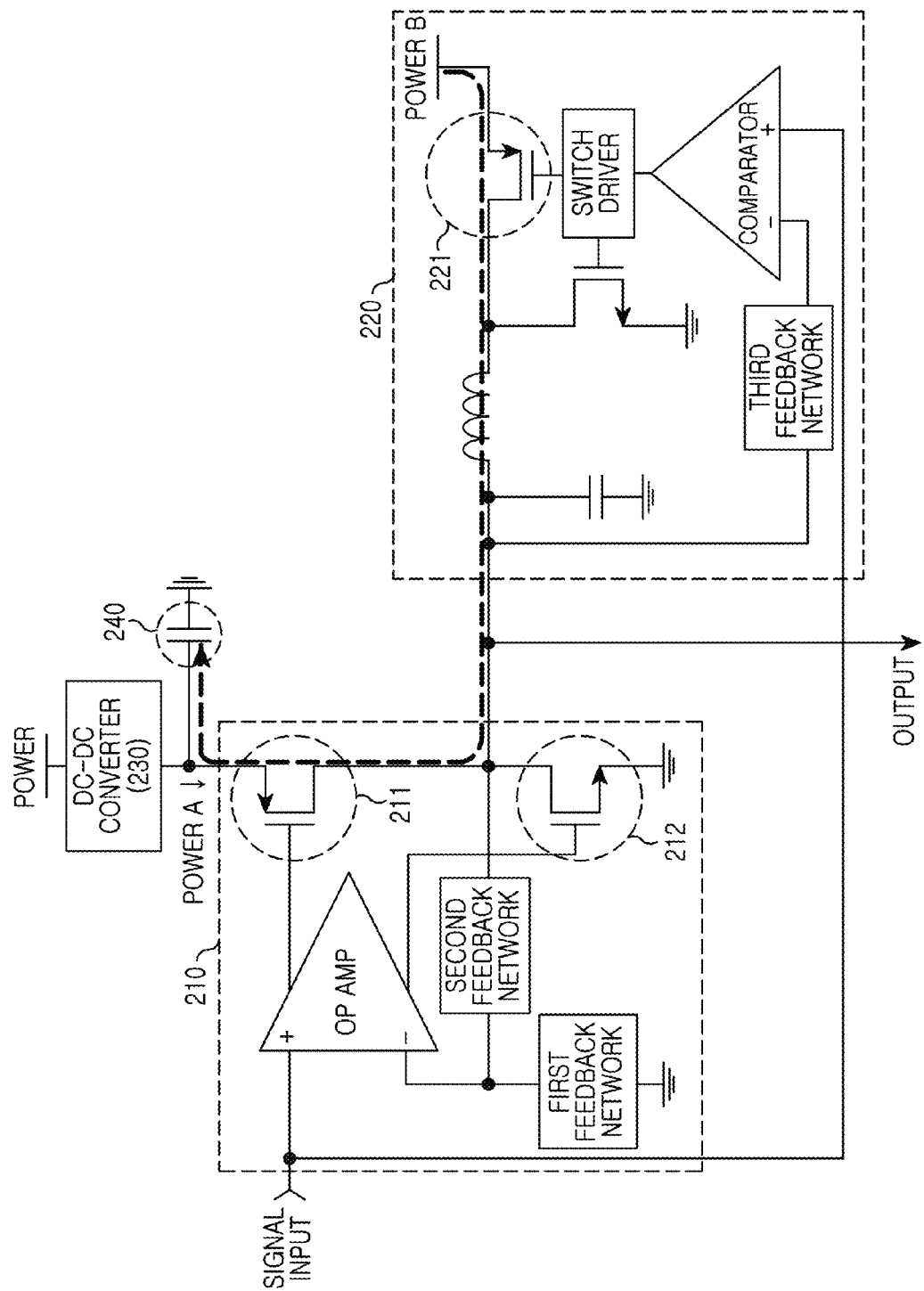
FIG. 2 is a view illustrating an in-current generated by a hybrid supply modulator according to an exemplary embodiment of the present invention.

FIG. 2 is a view illustrating an in-current generated by a hybrid supply modulator according to an exemplary embodiment of the present invention.

Referring to FIG. 2, it is assumed that in the hybrid supply modulator of FIG. 2, a power A provided to a linear regulator core 210 is power supplied via a DC-DC converter 230, and a power B provided to the SMPS core 220 is an always available power such as a battery. In this case, when an entire system including the DC-DC converter 230 is initially turned on, the SMPS core 220 supplied with the always available power B becomes ready first. However, the linear regulator core 210 supplied with the power A provided from the DC-DC converter 230 is delayed by a predetermined time and then becomes ready due to a time consumed until the power A supplied from the DC-DC converter 230 reaches a normal voltage level, that is, a time required while the DC-DC converter 230 starts an operation and a capacitor positioned at the output terminal is completely charged and so an operation output voltage is reached. At this point, an in-current situation occurs due to the output capacitor 240 of the DC-DC converter 230 providing the power A. Generally, the capacitor 240 disposed at an output terminal of the DC-DC converter 230 has a large capacity of a micro farad unit. Therefore, even though a maximum current that can be supplied by a core network of the DC-DC converter 230 is supplied together with turn-on of the capacitor 240, the capacitor 240 cannot be charged instantly.

However, at the point where the load capacitor 240 is not charged completely, in an aspect of the power B, the load capacitor 240 is an equivalent short-circuit, that is, is equal to the ground. Also, since the SMPS core 220 is in a ready state already, it can output a current. In the case where the linear regulator core 210 is not yet a ready state, a current output from the SMPS core 220 is not supplied to the load but supplied toward the power A of the ground. An inverse current flowing through an output terminal of the linear regulator core 210 turns on the upper pass transistor 211 or a body diode of the upper pass transistor 211, and is supplied to the load capacitor 240 of the DC-DC converter 230. In other words, an in-rush current occurs from the SMPS core 220 and flows in an inverse direction inside the linear regulator core 210 that has not woken up yet, thereby turning on the transistor 211 in an inverse direction, and charging the load capacitor 240 of the DC-DC converter 230 providing power of the linear regulator core 210. That is, the in-rush current is generated from a switch device 221 of the SMPS core 220, passes through the upper pass transistor 211 of the linear regulator core 210, flows in an inverse direction, and is supplied to the load capacitor 240 of the DC-DC converter 230. In FIG. 2, a path of the in-rush current is illustrated in a thick dashed line.

Figure 3:
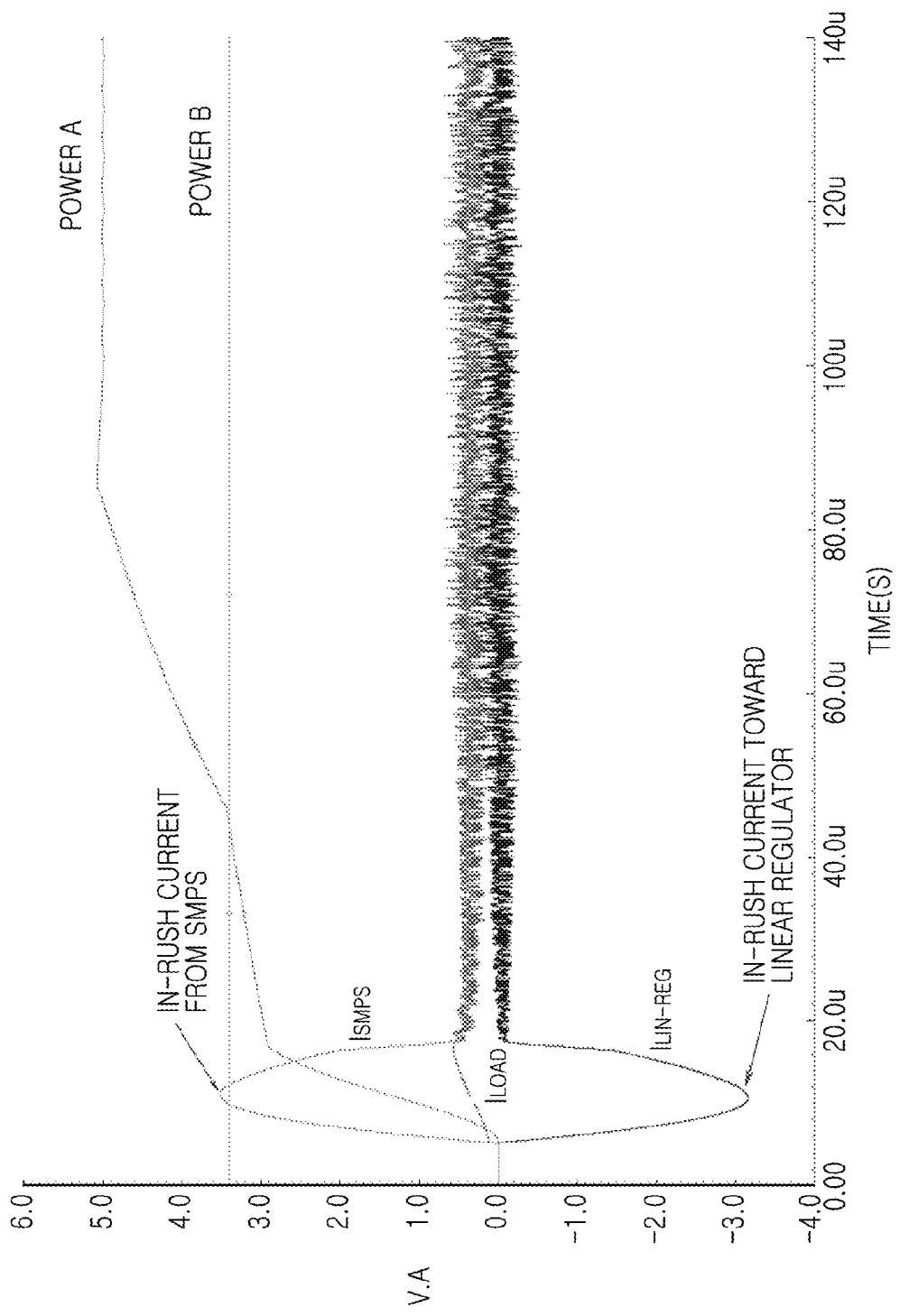
FIG. 3 is a graph illustrating measurement results of an in-current generated by a supply modulator according to an exemplary embodiment of the present invention.

FIG. 3 is a graph illustrating measurement results of an in-rush current generated by a supply modulator according to an exemplary embodiment of the present invention.

Referring to FIG. 3, results are illustrated based on an assumption of a case where the hybrid supply modulator of FIG. 1 receives an amplitude signal of 10 MHz and modulates power. Also, FIG. 3 assumes that a power B is 3.4V corresponding to a battery voltage and a power A is 5V that can be obtained by an operation of the boost DC-DC converter. As illustrated in FIG. 3, at an initial driving point, the power B immediately provides a voltage of 3.4V but the power A is delayed by a predetermined time until it reaches 5V. Accordingly, an in-current occurs in a timeframe of about 2 µs to 20 µs.

The in-rush current phenomenon described with reference to FIGS. 2 and 3 is a situation that does not occur in a supply modulator such as the power Integrated Circuit (IC) of the related art, a single linear regulator, a single SMPS, etc. Therefore, in a case of a hybrid supply modulator driven by unbalanced power sources that supplies different powers to the linear regulator and the SMPS, a protection mechanism for protecting a network from the described in-rush current situation should be prepared.

The over-current situation is described below. Like the general power IC, an over-current in a supply modulator may occur by variation of a driving load. However, an aspect of over-current occurrence in a case of the hybrid supply modulator is different from that in a case of the general power IC. The aspect of the over-current occurrence is described below with reference to FIG. 2. In the case where a load changes to low impedance suddenly during an operation of the supply modulator (for example, in case of a short circuit), since a bandwidth of an over-current is relatively wide, the linear regulator core 210 that can react to the load change relatively fast may output an over-current first. At this point, the over-current is supplied via the upper pass transistor 211. In the case where the over-current exceeds an amount and time which the upper pass transistor 211 can endure, a permanent damage may be given to a chip of the upper pass transistor 211.

In a case of FIG. 2, power of the linear regulator core 210 is the power B that has passed through the DC-DC converter 230. Therefore, in case of the load short-circuit, an over-current flowing through the upper pass transistor 211 is provided from the DC-DC converter 230. Generally, since the DC-DC converter 230 includes a built-in over-current protection network, when an over-current which the linear regulator core 210 generates from the power A exceeds a threshold of the protection network inside the DC-DC converter 230, the DC-DC converter 230 will stop supplying current. However, since the supply modulator includes the SMPS core 220 as well as the linear regulator core 210, when the DC-DC converter 230 stops supplying current, the SMPS core 220 will start to output an over-current insufficient from an output of the linear regulator core 210. That is, the over-current output by the SMPS core 220 will be supplied via the switch device 221, and permanent damage may be caused to the switch device 221 as long as a protection unit is not implemented.

On the contrary, in the case where the load changes to high impedance (for example, in case of an open circuit), the supply modulator should immediately stop supplying current for the load. At this point, the linear regulator core 210 of a relative broadband can stop supplying current relatively fast, but the SMPS core 220 of a narrowband cannot immediately stop a current that has been supplied. Therefore, instantaneously, the current whose supply has not been stopped by the SMPS core 220 does not flow through the load but flows through an output terminal of the linear regulator core 210 in an inverse direction. A current flowing in the inverse direction is directed to the ground via the lower pass transistor 212. Since the current flowing in the inverse direction occurs until the SMPS core 220 stops the current supply after the linear regulator core 210 stops the current supply and an amount of a current does not exceed an amount which the supply modulator supplies to the load when the supply modulator normally operates, this is less dangerousness than the case of low impedance. However, in the case where the supply modulator drives high power and a feedback network or the lower pass transistor 212 of the linear regulator core 210 is not designed to endure a current of a relevant magnitude, chip damage may occur.

An over-voltage situation is described below. The over-voltage occurs in the case where an output voltage of the supply modulator deviates from a limit of regulation due to malfunction of the supply modulator itself. In the case where the over-voltage occurs, a concept of monitoring an output voltage to sense an over-current occurrence is the same as a method applied to the general power IC. However, due to special characteristics of the hybrid supply modulator where the linear regulator core and the SMPS core are coupled, an object to protect and an action thereto are different from a case of the general power IC.

An over-temperature situation and a battery low voltage/high voltage situation are descried below. Protection from the over-temperature situation and the battery low voltage/high voltage situation is the same as a case of the general power IC. That is, specific causes and symptoms under which the over-temperature situation and the battery low voltage/high voltage situation occur are different, respectively, but an action for shutting off current supply from the supply modulator to protect a chip is the same. That is, an object to monitor in order to sense the over-temperature situation and the battery low voltage/high voltage situation is the same as the case of the general power IC. However, a recognition method of an over-stress situation, an object to protect, and an action should be properly determined depending on special characteristics of the hybrid supply modulator.

Hereinafter, configuration and the operation of the supply modulator for recognizing the described over-stress situations and taking an action according to the present exemplary embodiments are described in detail with reference to the drawings.

Figure 4:
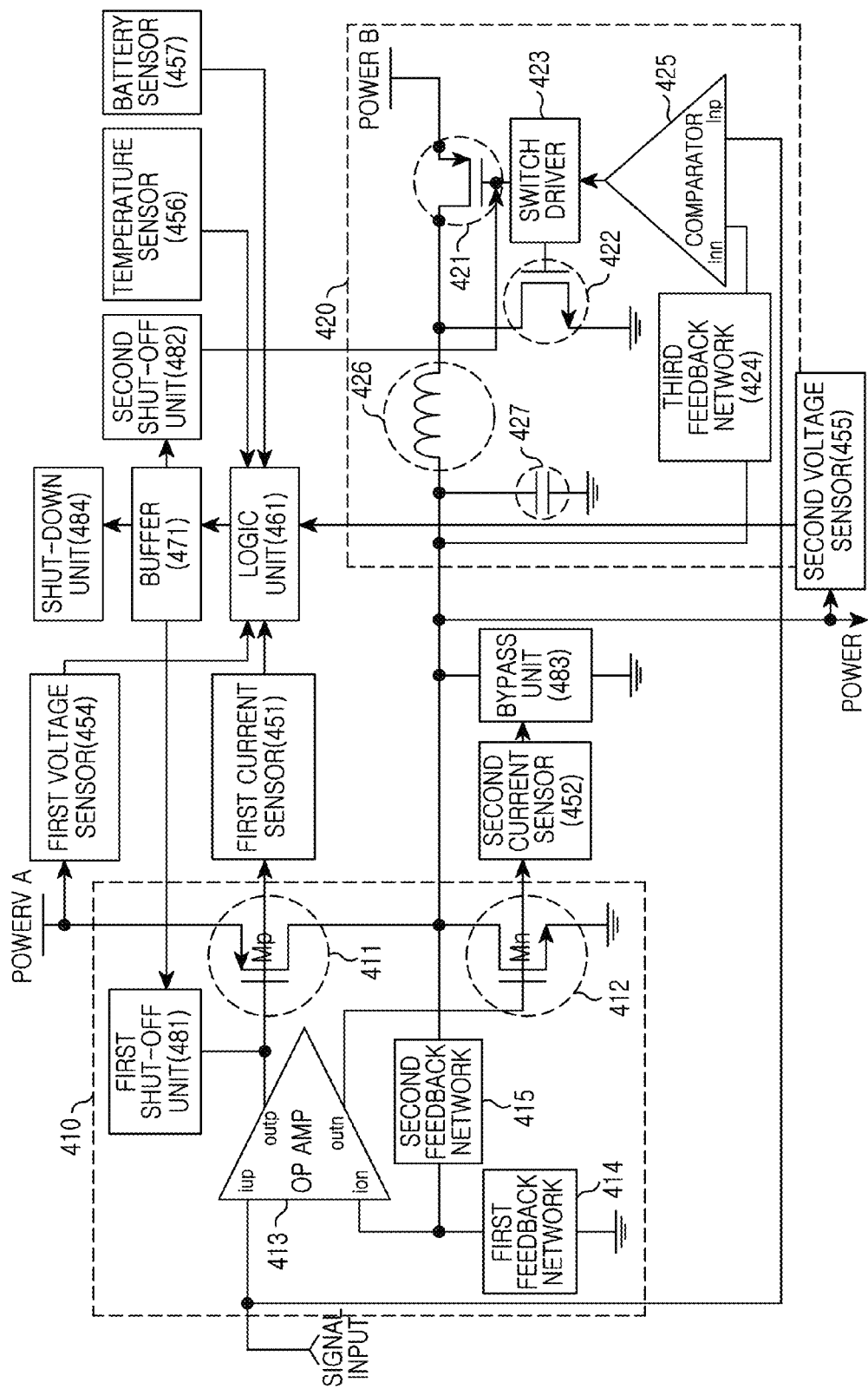
FIG. 4 is a block diagram illustrating a supply modulator according to an exemplary embodiment of the present invention.

FIG. 4 is a block diagram illustrating a supply modulator according to an exemplary embodiment of the present invention.

Referring to FIG. 4, the supply modulator includes a linear regulator core 410, an SMPS core 420, sensing units 451 to 457, a logic unit 461, a buffer unit 471, and actuator units 481 to 484.

The linear regulator core 410 linearly converts an input signal and supplements or sinks a current from an output of the SMPS core 420. The linear regulator core 410 includes an upper pass transistor 411, a lower pass transistor 412, an OP AMP 413, a first feedback network 414, and a second feedback network 415. The SMPS core 420 generates a current to be provided to a load. The SMPS core 420 includes an upper side switch device 421, a lower side switch device 422, a switch driver 423, a third feedback network 424, a comparator 425, an inductor 426, and a capacitor 427.

The sensing units 451 to 457 sense a degree of the described electric over-stress situations, compare the degree of the sensed stress with a reference value, and then output a decision value depending on the comparison result. Specifically, the sensing units 451 to 457 include a first current sensor 451, a second current sensor 452, a first voltage sensor 454, a second voltage sensor 455, a temperature sensor 456, and a battery sensor 457.

The first current sensor 451 senses a sourcing current of the linear regulator core 410 supplied via the upper pass transistor 411, and when the sourcing current is an over-current, outputs a logic signal informing this to the logic unit 461.

The second current sensor 452 senses a sinking current of the linear regulator core 410 flowing toward the ground via the lower pass transistor 412, and when this sinking current is an over-current, outputs a logic signal informing this to the logic unit 461.

The first voltage sensor 454 senses a voltage of the power A of the linear regulator core 410, compares a voltage of the power A with a reference voltage value, and when the power A is greater than the reference voltage value, outputs a logic signal informing this to the logic unit 461.

The second voltage sensor 455 senses an output voltage of the supply modulator, and when the voltage is an over-voltage, outputs a logic signal informing this to the logic unit 461.

The temperature sensor 456 senses a temperature of a chip. The battery sensor 457 senses a voltage of a battery.

The logic unit 461 receives decision values of the sensing units 451 to 457 to generate command logic signals for controlling operations of different blocks. Specifically, the logic unit 461 receives a logic signal from at least one of the sensing unit 451 to 457, and generates a command logic signal that operates at least one of the actuator units 481 to 484 corresponding to the provided logic signal.

The buffer unit 471 converts the command logic signal to a signal of an electric level recognizable by a relevant block. Specifically, the buffer unit 471 receives a command logic signal from the logic unit 461, converts the command logic signal to an electric signal of a level recognizable by a relevant actuator unit so that at least one of the actuator units 481 to 484 may perform a protection action, and then provides the electric signal to the relevant actuator unit.

The actuator units 481 to 484 apply an electric stimulus to a corresponding block inside the linear regulator core 410 and the SMPS core 420 depending on a signal provided from the buffer unit 471. Specifically, the actuator units 481 to 484 include a first shut-off unit 481, a second shut-off unit 482, a bypass unit 483, and a shut-down unit 484.

In the case where a current supplied by the linear regulator core 410 is an over-current, the first shut-off unit 481 shuts off a current which the linear regulator core 410 supplies to a load. For example, the first shut-off unit 481 pulls up a gate of the upper pass transistor 411. The pull-up denotes an operation for making a voltage difference between a gate terminal and a source terminal zero by raising a voltage of the gate. In the case where a current supplied by the linear regulator core 410 is an over-current or a current supplied by the SMPS core 420 is an over-current, the second shut-off unit 482 shuts off a current which the SMPS core 420 supplies to the load. For example, the second shut-off unit 482 pulls up a gate of the upper side switch device 421. The pull-up denotes an operation for making a gate-source voltage difference zero.

In the case where a sinking current of the linear regulator core 410 supplied via the lower pass transistor 412 is an over-current, the bypass unit 483 provides a bypass current sinking path in order to safely sink a current to the ground. In the case where a current supplied from the linear regulator core 410 or a current supplied from the SMPS core 420 is not a temporary over-current but a permanent current, or an output voltage of the supply modulator is not a temporary over-voltage but a permanent over-voltage, the shut-down unit 484 outputs a signal for shutting down the entire supply modulator. Also, in the case where the chip is over-heated or the battery voltage is a low voltage or an over-voltage, the shut-down unit 484 outputs a signal for shutting down the entire supply modulator.

Network protection from an in-rush current is described below with reference to the configuration illustrated in FIG. 4.

As described with reference to FIG. 2, since the in-rush current occurs from the SMPS core 420, protection from the in-rush current may be performed by shutting off a current supplied from the SMPS core 420. That is, after initial turn-on of the system, after the DC-DC converter starts an operation, until a load capacitor of the DC-DC converter is charged with charges and so the power A reaches a reference voltage value, at least one of the upper side switch device 421 of the SMPS core 420 and the upper pass transistor 411 of the linear regulator core 410 through which the in-rush current passes is maintained turned-off, so that the circuit may be protected from the in-rush current. That is, after power is applied to the system, in other words, after power-up, until the voltage A reaches the reference voltage value, a current flow of at least one transistor through which the in-rush current passes is shut-off, so that the network may be protected from the in-rush current. Upon initial turn-on, a state before a voltage of the power A reaches the reference voltage value is the same as a state of forcing the supply modulator to an off-state. Therefore, since a current flowing through the inductor 426 of the SMPS core 420 does not exist, the lower side switch device 422 for securing a free wheeling path may be safely in an off-state together. Also, the lower pass transistor 412 of the linear regulator core 410 for sinking an excessive current from the SMPS core 420 may be safely in an off-state together.

Here, the reference voltage value should be set as a specific value. According to an exemplary embodiment of the present invention, a voltage level of current power may be defined as the reference voltage value. For example, in case of a mobile terminal, the power is a battery power, and the power A may be generated by a step-up DC-DC converter. In this case, after initial turn-on of the system, when the DC-DC converter starts an operation and so the load capacitor is gradually charged, a voltage of the power A gradually increases from 0V. In the case where a voltage of the power A is lower than the battery voltage, the supply modulator maintains at least one of the upper side switch device 421 and the upper pass transistor 411 of the linear regulator core 410 at an off-state. For this purpose, after the initial turn-on, the first voltage sensor 454 senses a voltage rise of the power A, and recognizes that the voltage of the power A gets greater than the reference voltage value. That is, after the initial turn-on, the first voltage sensor 454 senses the voltage rise of the power A, and when the voltage of the power A gets greater than the reference voltage value, the first voltage sensor 454 outputs a decision value to the logic unit 461. For example, the first voltage sensor 454 may be configured as in FIG. 5.

Figure 5:
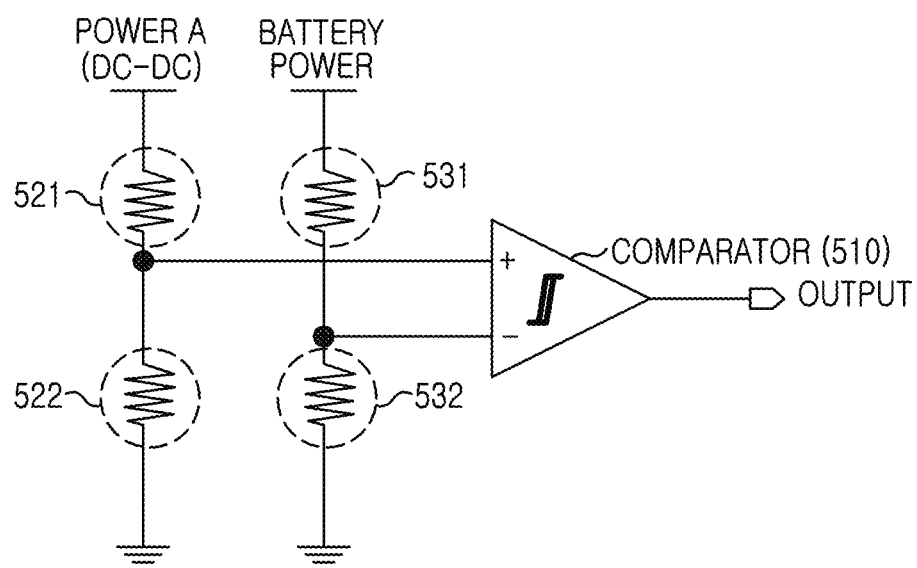
FIG. 5 is a block diagram illustrating a first voltage sensor of a supply modulator according to an exemplary embodiment of the present invention.

FIG. 5 is a block diagram illustrating a first voltage sensor of a supply modulator according to an exemplary embodiment of the present invention.

Referring to FIG. 5, the first voltage sensor 454 includes a comparator 510 for comparing a voltage of power A with a voltage of a battery power, resistors 521 and 522 for generating an input to the comparator 510 corresponding to the voltage value of the power A, and resistors 531 and 532 for generating an input to the comparator 510 corresponding to the voltage value of the battery power. The battery power having a fixed voltage is linearly scaled by a resistance network including the resistors 531 and 532, and the linearly scaled value is supplied to a negative input of the comparator 510 as a reference voltage. In addition, the power A having a variable voltage is linearly scaled by a resistance network including the resistors 521 and 522, and compared with the reference voltage by the comparator 510. When a voltage level of the power A is greater than a voltage level of the battery power, an output of the comparator 510 becomes high.

Figure 6:
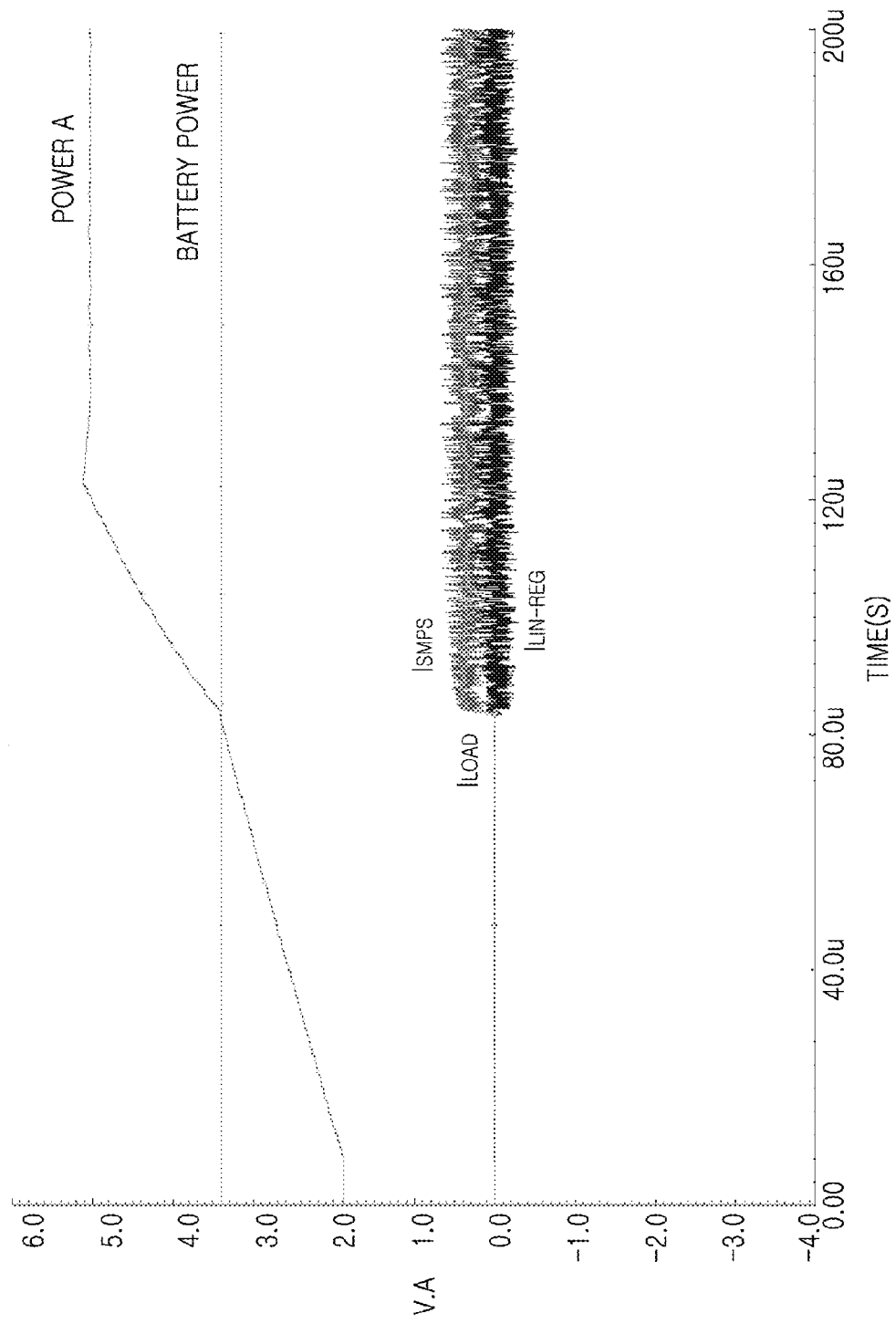
FIG. 6 is a graph illustrating a current waveform of a supply modulator according to an exemplary embodiment of the present invention.

FIG. 6 is a graph illustrating a current waveform of a supply modulator according to an exemplary embodiment of the present invention.

Referring to FIG. 6, an example is illustrated of a waveform of the supply modulator in the case where the in-rush current has been removed by the above process. In FIG. 6, it is assumed that the reference voltage value is 3.4V. As illustrated in FIG. 6, until the load capacitor of the DC-DC converter is charged and so the power A reaches 3.4V, which is the battery voltage, the linear regulator core 410 and the SMPS core 420 maintain an off-state. Accordingly, the linear regulator core 410 and the SMPS core 420 are activated after a point at which the power A exceeds 3.4V.

Network protection from an over-current by a short-circuit of a load is described with reference to the configuration illustrated in FIG. 4.

Protection from an over-current by a short-circuit of a load that may occur during a normal operation of a supply modulator may be performed by shutting off current supply of the upper pass transistor 411 of the linear regulator core 410 that can react swiftly. For this purpose, the first current sensor 451 senses a current flowing through the upper pass transistor 411, and when the sensed current value exceeds the over-current reference value, the first current sensor 451 outputs a decision value informing of the occurrence of an over-current to the logic unit 461. Accordingly, the logic unit 461 generates a control command, and the buffer unit 471 converts the control command to an electric signal suitable for a relevant operation block, and then outputs the electric signal to the first shut-off unit 481, which is the relevant operation block. The first shut-off unit 481 shuts off the upper pass transistor 411 by pulling up a gate of the upper pass transistor 411 to a level of the power A.

Also, a current of the SMPS core 420 that reacts slowly compared to the linear regulator core 410 but has a greater current supply capability can be shut off. The current shut off of the SMPS core 420 is performed by turning off an upper side switch device 421 of the SMPS core 420. That is, the second shut-off unit 482 can shut off a current of the upper side switch device 421 by pulling up a gate of the upper side switch device 421. At this point, a lower side switch device 422 of the SMPS core 420 should be maintained at an on-state so that a current that has flowed through the inductor 426 may spontaneously fade out via a free wheeling path since the current that has flowed through the inductor 426 of the SMPS core 420 cannot be shut off suddenly during an operation of the supply modulator.

The load short-circuit situation may occur temporarily due to intermittent load change. Also, the load short-circuit situation may cause a consistent over-current due to a complete failure of the load. In a case of the complete failure, it may be more advantageous in aspects of safety of a chip and unnecessary power consumption prevention to completely shut down all cores and respective functional blocks included in the supply modulator as well as the upper side switch device 421 of the SMPS core 420 and the upper pass transistor 411 of the linear regulator core 410.

In a case of shutting down a permanent load-failed system, understanding of a cause of the short-circuit situation should be preceded before system shut-down. For example, repetitive occurrence of the short-circuit situation may be defined as a decision standard of the short-circuit situation by a permanent load failure. In this case, when an over-current by the load short-circuit is checked, the supply modulator performs the described current limiting procedure, logs event occurrence, and then releases the limiting of current. At this point, when the number of times a logged event occurs exceeds a threshold, the supply modulator determines the load short-circuit situation by a permanent failure, and the logic unit 461 generates a command logic output for shutting down the entire system.

Figure 7:
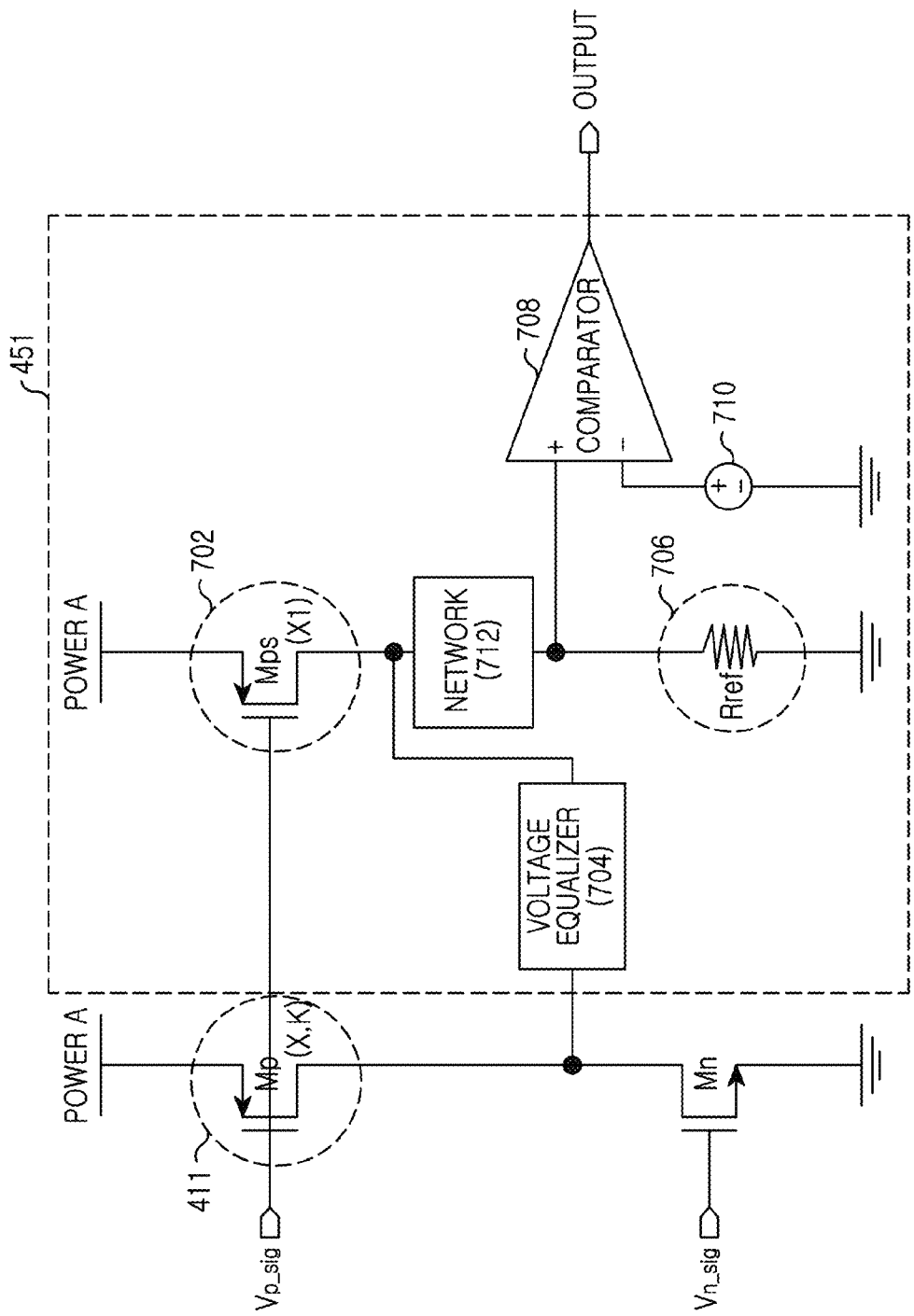
FIG. 7 is a block diagram illustrating a first current sensor of a supply modulator according to an exemplary embodiment of the present invention.

FIG. 7 is a block diagram illustrating a first current sensor of a supply modulator according to an exemplary embodiment of the present invention.

Referring to FIG. 7, a transistor Mps 702 scales a current flowing through the upper pass transistor Mp 411 by K:1 and senses the same. For the scaling of K:1, drain voltages of the transistor Mps 702 and the upper pass transistor Mp 411 are equalized by a voltage equalizer 704. An output current of the linear regulator scaled by 1/K times is converted to a voltage via a reference resistor Rref 706. A comparator 708 compares an internal reference voltage 710 corresponding to an over-current standard with the voltage. When the voltage is greater than the reference voltage 710, the comparator 708 outputs a high signal. A network 712 performs as a rectifier. That is, although the drain voltages of the transistor Mps 702 and the upper pass transistor Mp 411 are equalized by a voltage equalizer 704, a voltage of positive (+) port of the comparator 708 is maintained by the network 712. Therefore, the voltage of positive (+) port of the comparator 708 depends on a source-to-drain current of the transistor Mps 702. For example, the network 712 may include a NMOS transistor where a drain is coupled with the drain of the transistor Mps 702 and a source is coupled with the positive (+) port of the comparator 708.

Figure 8:
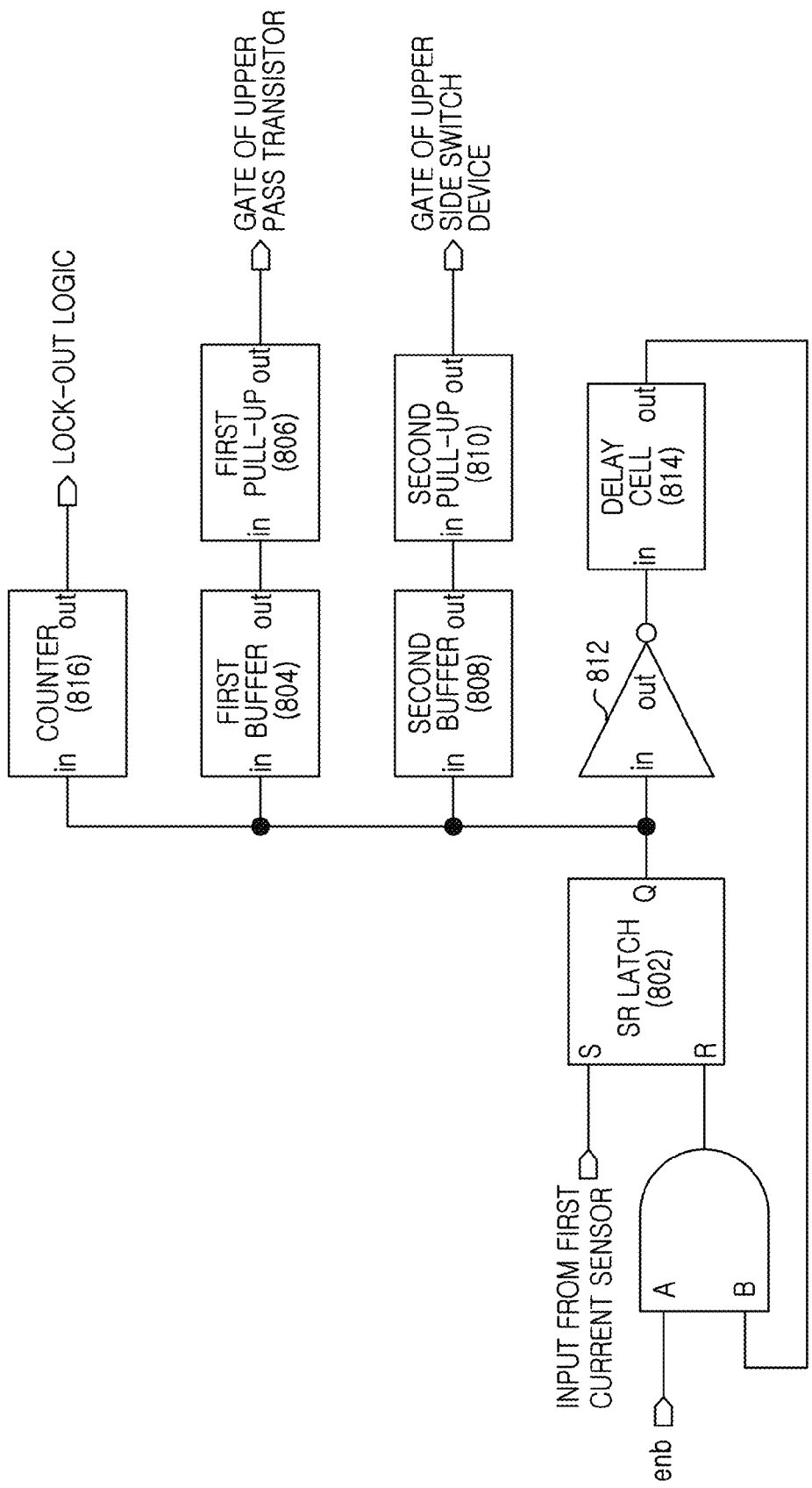
FIG. 8 is a block diagram illustrating a logic unit of a supply modulator according to an exemplary embodiment of the present invention.

FIG. 8 is a block diagram illustrating a logic unit of a supply modulator according to an exemplary embodiment of the present invention.

A configuration example of the logic unit 461 illustrated in FIG. 8 has an over-current checking function, a current limiting function, an event logging function, and a limit releasing function.

Referring to FIG. 8, when a high is input to an S input of an SR latch 802, a state of a Q output is switched from low to high. A high state value of the Q output passes through a first buffer 804 and a first pull-up 806 to pull up a gate voltage of the upper pass transistor 411 of the linear regulator 410 to a voltage of the power A. Also, the high state value of the Q output passes through a second buffer 808 and the first pull-up 810 to pull up a gate voltage of the upper side switch device 421 of the SMPS 420 to a voltage of the power B. Also, the high state value of the Q output is switched to low via an inverter cell 812, and delayed by a predetermined time at a delay cell 814, and then fed back to an R input of the SR latch

802. When a low state value is input to the R input after delayed by the predetermined time, the SR latch 802 switches a state of the Q output from high to low. Accordingly, an output that passes through the first buffer 804 and the first pull-up 806 is switched to open, and current supplied via the upper pass transistor 411 is resumed. Also, an output that passes through the second buffer 808 and the second pull-up 810 is switched to open, and current supplied via the upper side switch device 421 is resumed. As described above, when an output current supply of the supply modulator is shut off for a predetermined time by the delay cell 814 and then resumed, over-current sensing by the first current sensor 451 is performed again and when the over-current occurs, the above-described procedure is repeatedly performed.

In FIG. 8, a counter 816 detects and logs a rising edge of a Q output of the SR latch 802. When the logged number of times exceeds a set number of times, the counter 816 converts a logic output to high. The counter 816 commands shut-down of the entire chip by outputting the logic output as an input of lock-out logic that can command shut-down of the entire chip such as Undervoltage Lockout (UVLO). That is, when the number of times of over-current detection exceeds a set value due to repetition of the above-described procedure, the logic unit 461 stops repetition of the procedure and shuts down the entire chip. Among configuration blocks illustrated in FIG. 8, the buffers 804 and 808 may be realized using scaled stacks of inverters, the pull-ups 806 and 810 may be realized using switch networks, the counter 816 may be realized using memory devices such as a D-flip flop, and the delay cell 814 may be realized using cascaded inverters and an RC network.

Network protection from an over-current by an open circuit of a load is described below with reference to the configuration illustrated in FIG. 4.

When an open circuit of a load occurs during a normal operation of the supply modulator, the linear regulator core 410 may reduce the supply of current relatively fast in response to the situation, but the SMPS core 420 cannot respond fast due to a narrowband characteristic. At this point, an output current of the SMPS core 420 that cannot be directed to the load flows toward an output terminal of the linear regulator core 410, flows into the inside of the linear regulator core 410, and will be discharged to the ground via the lower pass transistor 412. At this point, in the case where the magnitude of the current is less than a threshold acceptable by the lower pass transistor 412, damage is not caused to the chip, so that the current may be safely discharged to the ground. However, in the case where the magnitude of the current is greater than the threshold acceptable by the lower pass transistor 412, damage may be caused to the chip, so that the supply modulator should prevent an over-current from passing through the lower pass transistor 412. Therefore, the magnitude of the current dumped to the ground via the lower pass transistor 412 should be sensed, and whether the magnitude of the current exceeds a set reference value should be tested. When the magnitude of the current exceeds the set reference value, a corresponding protection action should be performed.

As the protection action, the supply modulator may allow the over-current to be discharged to the ground via a different bypass path, not the lower pass transistor 412. As illustrated in FIG. 4, the second current sensor 452 senses a current flowing through the lower pass transistor 412. When determining that the magnitude of the current is an over-current exceeding the set value, the second current sensor 452 outputs a signal informing of the occurrence of the over-current to the logic unit 461. Accordingly, the bypass unit 483 is activated, and as a result, the over-current is discharged to the ground before reaching the lower pass transistor 412. That is, the output terminal of the linear regulator core 410 and the bypass unit 483 providing a bypass path that bypasses the ground are activated, so that the network may be protected from the over-current.

Even in a case of the load open circuit, similarly to the case of the load short-circuit, the supply modulator may determine a permanent open circuit depending on whether the situation repetitively occurs, and completely shut down the chip.

Figure 9:
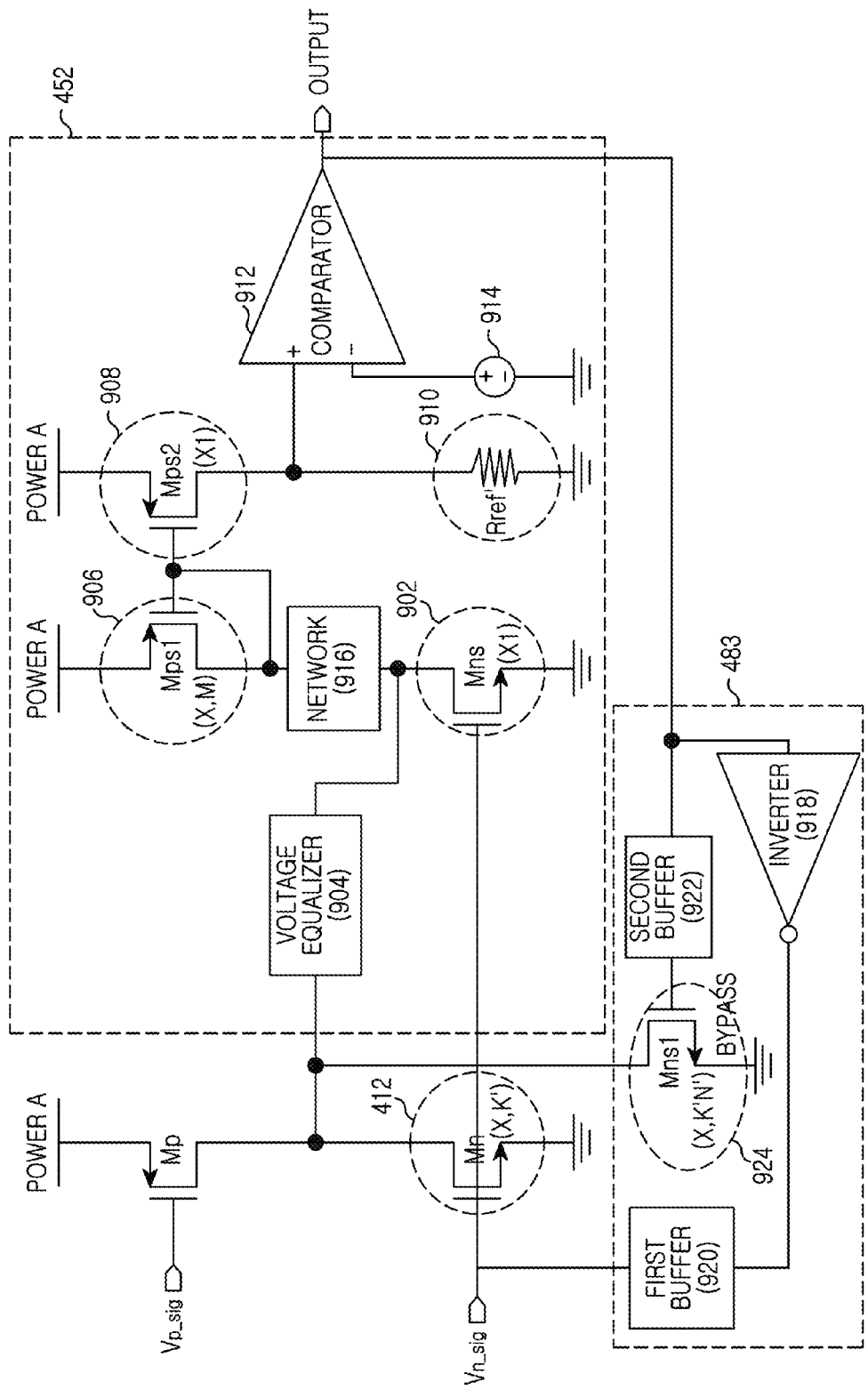
FIG. 9 is a block diagram illustrating a second current sensor and a bypass unit of a supply modulator according to an exemplary embodiment of the present invention.

FIG. 9 is a block diagram illustrating a second current sensor and a bypass unit of a supply modulator according to an exemplary embodiment of the present invention.

Referring to FIG. 9, the second current sensor 452 is described first and then the bypass unit 483 is described. Regarding the second current sensor 452, A transistor Mns 902 scales a current flowing through the lower pass transistor 412 by K':1 and senses the same. For the scaling of K':1, drain voltages of the lower pass transistor 412 and the transistor Mns 902 are equalized by a voltage equalizer 904. An output current of the linear regulator 410 scaled by 1/K' times is converted to a voltage of a ground reference by a transistor Mps1 906, a transistor Mps2 908, which are p-channel metal-oxide-semiconductor or field-effect transistor (PMOSFET) mirror turn-arounds, and a resistor Rref' 910. A comparator 912 compares an internal reference voltage 914 corresponding to an over-current reference with a voltage of the ground reference. When the voltage of the ground reference is greater than the internal reference voltage, the comparator 912 switches an output voltage state to high. A network 916 performs as a rectifier. That is, although the drain voltages of the lower pass transistor 412 and the transistor Mns 902 are equalized by a voltage equalizer 904, a voltage of a drain of the transistor Mps1 906 is maintained by the network 916. Therefore, the voltage of the drain of the transistor Mps1 906 depends on a source-to-drain current of the transistor Mns 902. For example, the network 916 may include a NMOS transistor where a drain is coupled with the drain of the transistor Mns 902 and a source is coupled with the drain of the transistor Mps1 906.

The bypass unit 483 is now described with reference to FIG. 9. When an output of the comparator 912 is switched from low to high, an output of the comparator 912 passes through an inverter 918 and a first buffer 920 and is applied to a gate of the lower pass transistor Mn 412. The gate voltage is pulled down to low, and accordingly, the lower pass transistor Mn 412 is turned off. Also, a high signal, which is an output of the comparator 912, passes through a second buffer 922 and is applied to a gate of a transistor Mns1 924. The gate voltage is pulled up, and the transistor Mns1 924 is turned on, so that an over-current is discharged to the ground.

Network protection from an over-voltage is described below with reference to the configuration illustrated in FIG. 4.

When an over-voltage exceeding a regulation range of an output voltage occurs during a normal operation of the supply modulator, the second voltage sensor 455 senses an over-voltage. When the over-voltage is sensed, the supply modulator doesn't supply a current any more, similarly to the case of the load short-circuit, when the voltage sensed by the second voltage sensor 455 exceeds an over-voltage reference value, the supply modulator turns off the upper pass transistor 411 of the linear regulator core 410 and maintains the upper side switch device 421 of the SMPS core 420 at an off-state. The protection from the over-voltage aims to provide reliability of a device in preparation for a failure of a transistor. However, for free wheeling of a remnant inductor 426 current of the SMPS core 420, it is preferable that the lower pass transistor 412 and the lower side switch device 422 maintain an on-state.

Also, in a case of the over-voltage, the supply modulator may determine a successive over-voltage by a permanent failure of the supply modulator depending on whether a situation repetitively occurs and completely shuts down the system.

Figure 10:
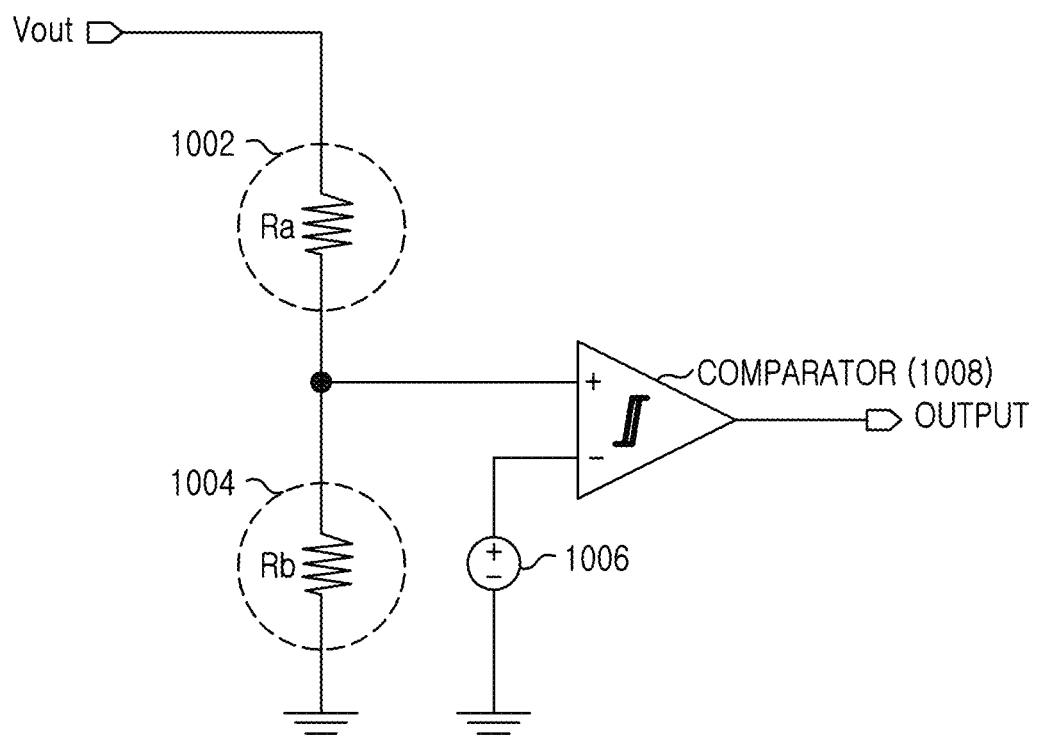
FIG. 10 is a block diagram illustrating a second voltage sensor of a supply modulator according to an exemplary embodiment of the present invention.

FIG. 10 is a block diagram illustrating a second voltage sensor of a supply modulator according to an exemplary embodiment of the present invention.

Referring to FIG. 10, Vout, which is an output voltage of the supply modulator, is level-shifted by a resistor network configured with a resistor Ra 1002 and a resistor Rb 1004. A comparator 1008 compares an internal reference voltage 1006, which is an over-voltage reference, with the level-shifted voltage. When the level-shifted voltage is greater than the internal reference voltage, the comparator 1008 switches an output voltage state to high.

Network protection from over-temperature and low voltage/high voltage of a battery is described below with reference to the configuration illustrated in FIG. 4.

Over-temperature and low voltage/high voltage of a battery that should be monitored over an entire operation section of the supply modulator may be sensed by the temperature sensor 456 and the battery sensor 457. When the over-temperature and the low voltage/high voltage of the battery are sensed, as a protection action, similarly to the case of the over-voltage, the supply modulator turns off the upper pass transistor 411 of the linear regulator core 410 and maintains the upper side switch device 421 of the SMPS core 420 at an off-state. Also, for free wheeling of a remnant inductor 426 current of the SMPS core 420, the lower pass transistor 412 and the lower side switch device 422 should maintain an on-state. However, unlike the cases of the over-current and the over-voltage, in case of the over-temperature and the low voltage/high voltage of the battery, it is preferable to shut down the entire chip upon occurrence of an initial situation without a procedure of determining a permanent damage depending on whether a situation repetitively occurs. However, the free wheeling path should be secured.

A supply modulator according to the present exemplary embodiment may be configured as described above. Hereinafter, an operation of the supply modulator according to an exemplary embodiment of the present invention is described with reference to FIGS. 11 to 15. The operation of the supply modulator according to an exemplary embodiment of the present invention to be described below can be implemented in a system realized in a Central Processing Unit (CPU) and a Digital Signal Processing (DSP) program and having a supply modulator. Hereinafter, for convenience in description, the present exemplary embodiments define a subject of electric over-stress recognition and protection operations as a 'system'.

Figure 11:
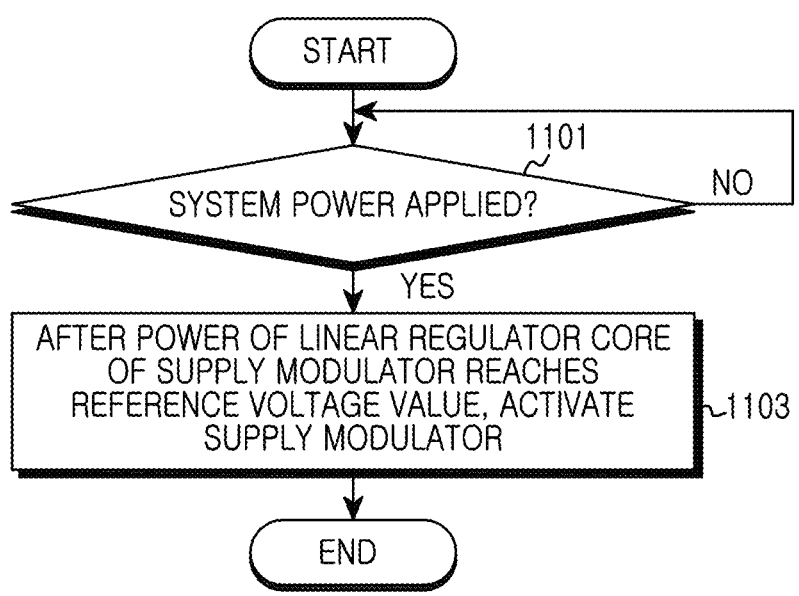
FIG. 11 is a flowchart illustrating a protection procedure from an in-current of a supply modulator according to an exemplary embodiment of the present invention.

FIG. 11 is a flowchart illustrating a protection procedure from an in-current of a supply modulator according to an exemplary embodiment of the present invention.

Referring to FIG. 11, it is determined whether power is applied to the system in step 1101. In other words, the system determines whether the system is powered up.

When the power is applied to the system, the system proceeds to step 1103 to activate a supply modulator after power of a linear regulator core of the supply modulator reaches a reference voltage value. In other words, the system controls the supply modulator to an inactive state until the power of the linear regulator core of the supply modulator reaches the reference voltage value. For sensing the voltage of the power of the linear regulator core, the supply modulator may have a voltage sensor connected to the power of the linear regulator core.

That is, all of elements sharing a power apply signal of the system, for example, a DC-DC converter, etc. are turned on, but the linear regulator core and the SMPS core inside the supply modulator enter an inactive state. For example, the system may control the supply modulator to be in an inactive state by maintaining at least one of the upper side switch device of the SMPS core and the upper pass transistor of the linear regulator core through which an in-rush current passes at an off-state. When a load capacitor of the DC-DC converter is charged due to an operation of the DC-DC converter and a voltage of the power of the linear regulator core exceeds a reference voltage value, the linear regulator core and the SMPS core are simultaneously turned on to start a supply modulation operation. Here, the reference voltage value may be defined as a battery voltage provided to the SMPS core.

Figure 12:
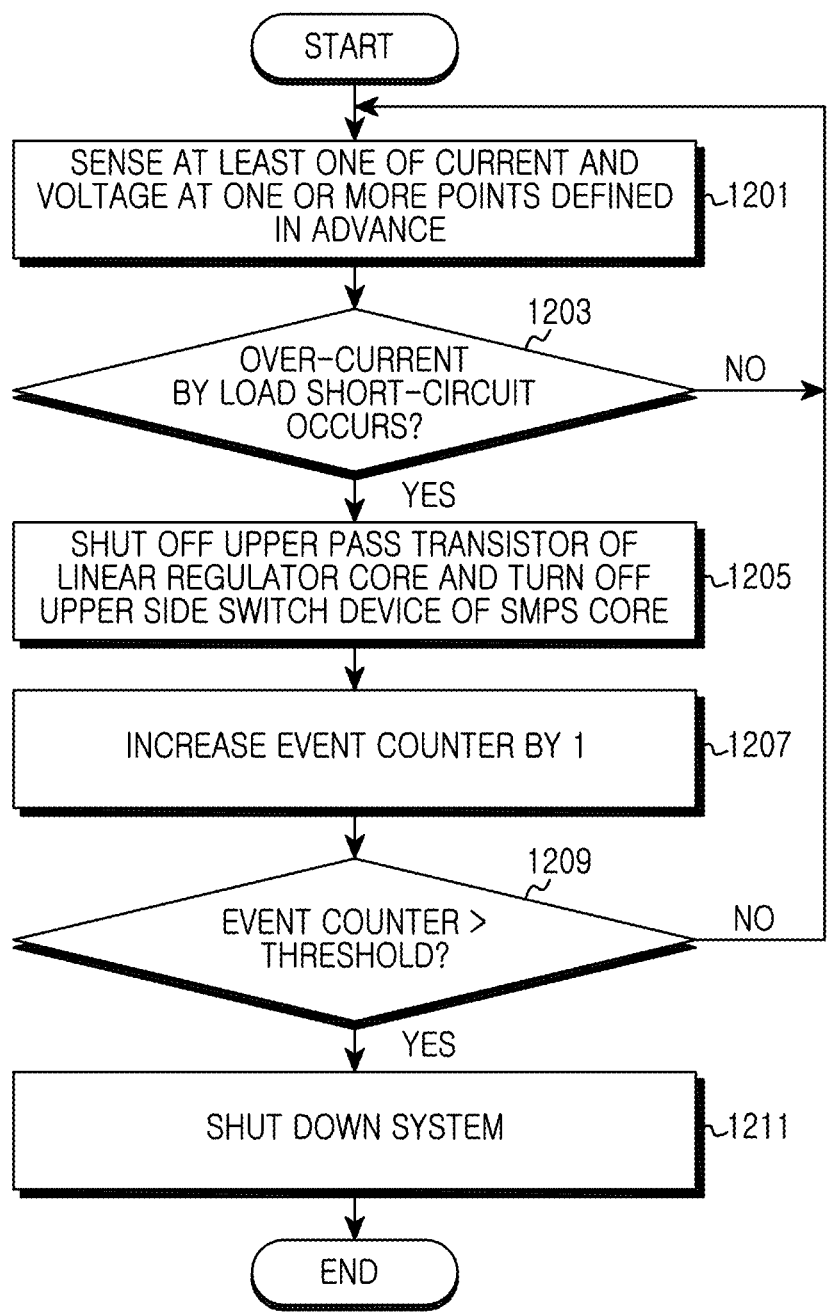
FIG. 12 is a flowchart illustrating a protection procedure from an over-current by load short of a supply modulator according to an exemplary embodiment of the present invention.

FIG. 12 is a flowchart illustrating a protection procedure from an over-current by load short of a supply modulator according to an exemplary embodiment of the present invention.

Referring to FIG. 12, a system senses at least one of a current and a voltage at one or more points defined in advance during a normal operation of the supply modulator in step 1201. For this purpose, the supply modulator of the system may have at least one of a current sensor and a voltage sensor.

Subsequently, the system proceeds to step 1203 to determine whether an over-current by a load short-circuit occurs using the sensing result. The over-current by the load short-circuit denotes a phenomenon where a load connected to an output terminal of the supply modulator becomes an equivalent short-circuit, so that an over-current flows inside the linear regulator core and the SMPS core. For example, in the case where a current flowing through the upper pass transistor inside the linear regulator core exceeds a reference value, the system determines whether an over-current by the load short-circuit occurs.

When an over-current by the load short-circuit occurs, the system proceeds to step 1205 to shut off the upper pass transistor of the linear regulator core, and turn off the upper side switch device of the SMPS core. To shut off the upper pass transistor, the system may pull up a gate of the upper pass transistor. Accordingly, an over-current supplied to the load from the linear regulator core and the SMPS core is shut off.

After that, the system proceeds to step 1207 to increase an event counter corresponding to the over-current by the load short-circuit by 1. The event counter is for counting the number of times by which an over-current phenomenon by the load short-circuit has occurred. The event counter is used for determining a permanent load short-circuit situation. Subsequently, the system proceeds to step 1209 to determine whether an event counter value exceeds a threshold. In other words, the system determines whether the event counter value exceeds a predetermined number of times and so the over-current situation by the load short-circuit occurs.

When the event counter value is equal to or less than the threshold, the system returns to step 1201. On the contrary, when the event counter value exceeds the threshold, the system proceeds to step 1211 to shut down the system. According to another exemplary embodiment of the present invention, the system may shut down only the supply modulator.

Figure 13:
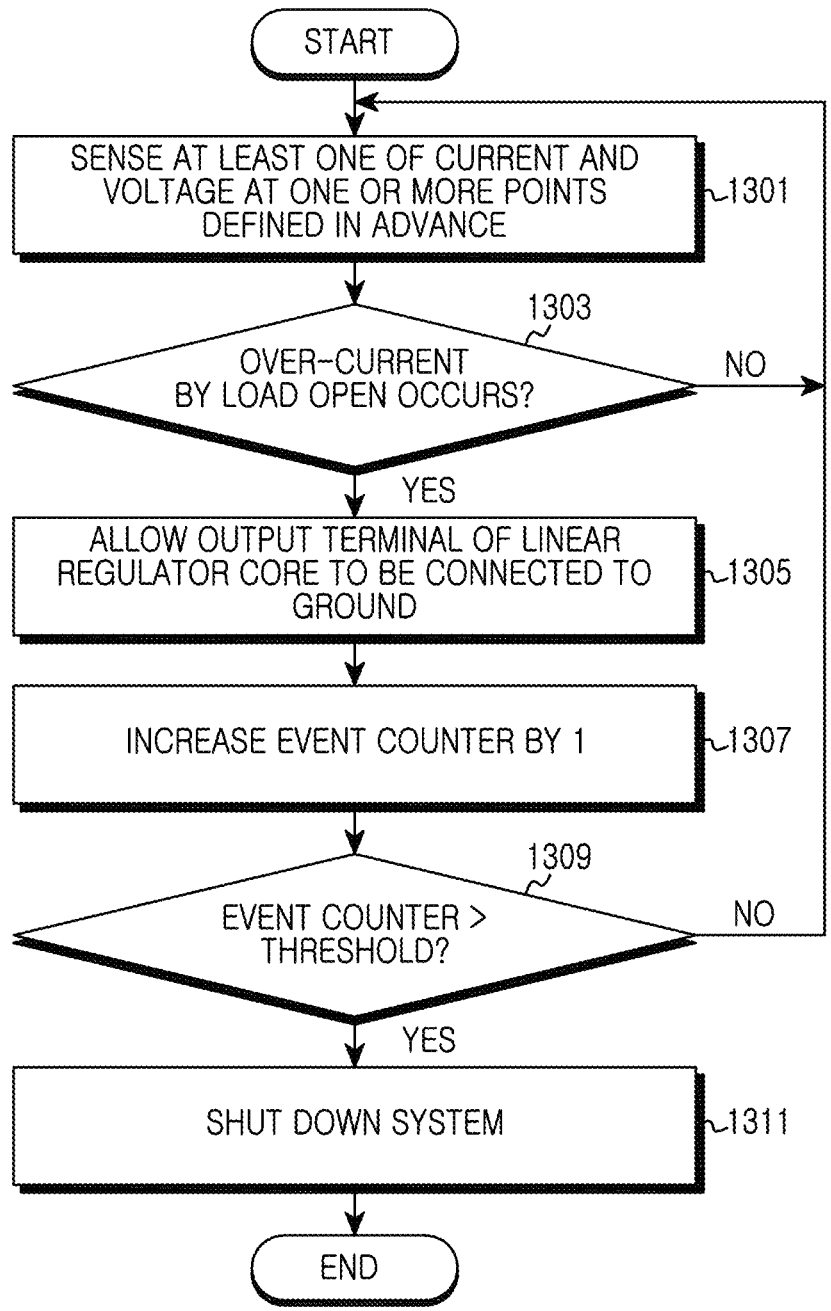
FIG. 13 is a flowchart illustrating a protection procedure from an over-current by load open of a supply modulator according to an exemplary embodiment of the present invention.

FIG. 13 is a flowchart illustrating a protection procedure from an over-current by load open of a supply modulator according to an exemplary embodiment of the present invention.

Referring to FIG. 13, a system senses at least one of a current and a voltage at one or more points defined in advance during a normal operation of the supply modulator in step 1301. For this purpose, the supply modulator of the system may have at least one of a current sensor and a voltage sensor.

Subsequently, the system proceeds to step 1303 to determine whether an over-current by load open occurs using the sensing result. The over-current by the load open denotes a phenomenon where a load connected to an output terminal of the supply modulator becomes an equivalent open circuit, so that an over-current flows inside the linear regulator core and the SMPS core. For example, in the case where a current flowing through the lower pass transistor inside the linear regulator core exceeds a limit value, the system determines whether an over-current by the load open occurs.

When an over-current by the load open occurs, the system proceeds to step 1305 to allow an output terminal of the linear regulator core to be connected to the ground. In other words, the system controls the over-current to be discharged to the ground via a different bypass path, not the lower pass transistor. For this purpose, the supply modulator may have a bypass network whose one end is connected to the output terminal of the linear regulator core and whose other end is connected to the ground. Accordingly, the over-current flowing toward the lower pass transistor of the linear regulator core is discharged to the ground.

After that, the system proceeds to step 1307 to increase an event counter value corresponding to the over-current by the load open by 1. The event counter is for counting the number of times by which an over-current phenomenon by the load open has occurred. The event counter is used for determining a permanent load open situation. Subsequently, the system proceeds to step 1309 to determine whether the event counter exceeds a threshold. In other words, the system determines whether the event counter exceeds a predetermined number of times and an over-current situation by the load open has occurred.

When the event counter is equal to or less than the threshold, the system returns to step 1301. On the contrary, when the event counter exceeds the threshold, the system proceeds to step 1311 to shut down the system. According to an exemplary embodiment of the present invention, the system may shut down only the supply modulator.

Figure 14:
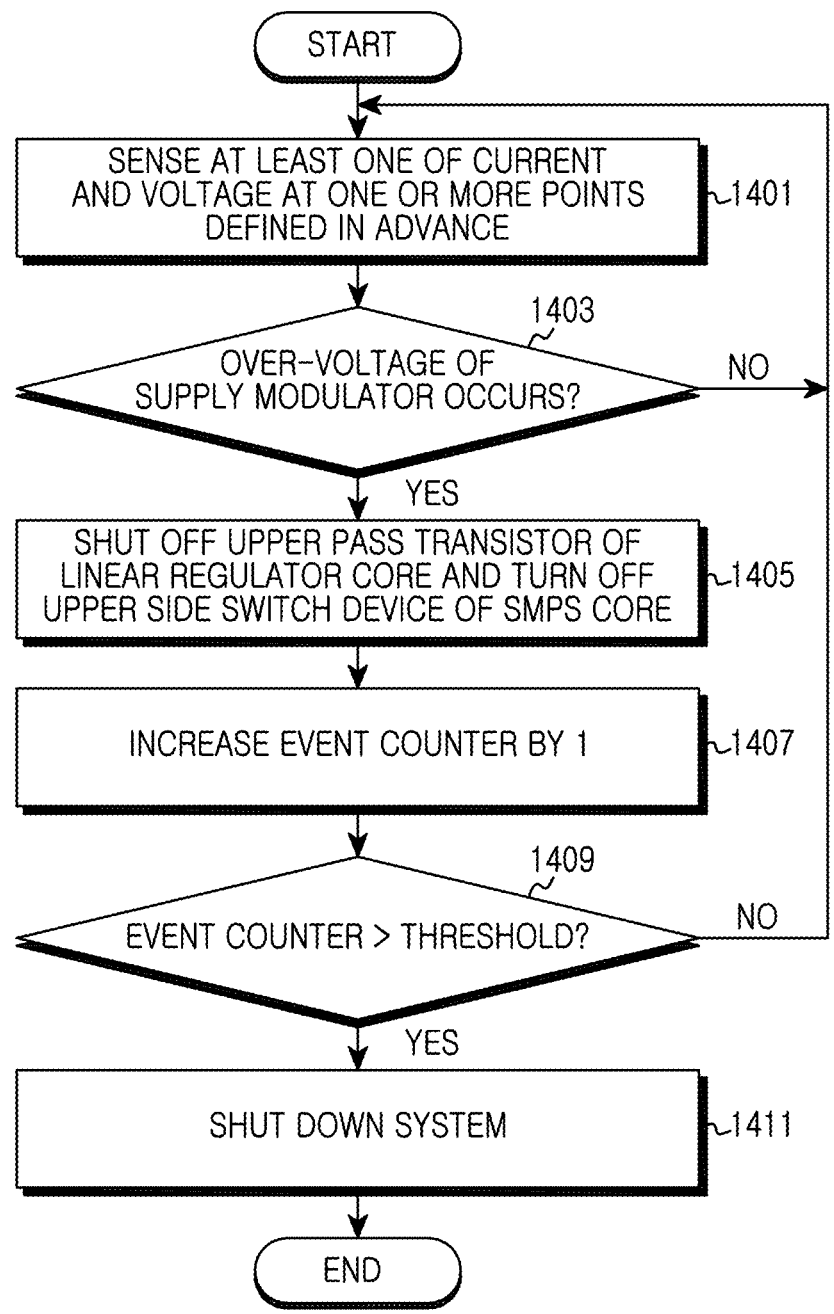
FIG. 14 is a flowchart illustrating a protection procedure from an over-voltage output of a supply modulator according to an exemplary embodiment of the present invention.

FIG. 14 is a flowchart illustrating a protection procedure from an over-voltage output of a supply modulator according to an exemplary embodiment of the present invention.

Referring to FIG. 14, a system senses at least one of a current and a voltage at one or more points defined in advance during a normal operation of the supply modulator in step 1401. For this purpose, the supply modulator of the system may have at least one of a current sensor and a voltage sensor.

Subsequently, the system proceeds to step 1403 to determine whether an over-voltage of the output of the supply modulator occurs using the sensing result. The over-voltage of the output denotes a phenomenon where the voltage of the output terminal of the supply modulator exceeds a regulation range of an output voltage. For example, in the case where the voltage of the output terminal of the supply modulator exceeds a reference value, the system determines whether the over-voltage of the output occurs.

When the over-voltage of the output occurs, the system proceeds to step 1405 to shut off the upper pass transistor of the linear regulator core and turns off the upper side switch device of the SMPS core. To shut off the upper pass transistor, the system may pull up a gate of the upper pass transistor. Accordingly, an over-current supplied to a load from the linear regulator core and the SMPS core is shut off, and an output voltage drops down. However, though not illustrated in FIG. 14, for free wheeling of a remnant inductor current of the SMPS core, the system may maintain the lower pass transistor of the linear regulator core and the lower side switch device of the SMPS core in an on-state.

After that, the system proceeds to step 1407 to increase an event counter corresponding to an over-voltage of the output by 1. The event counter is for counting the number of times by which an over-voltage phenomenon of the output has occurred. The event counter is used for determining a permanent failure of the supply modulator. Subsequently, the system proceeds to step 1409 to determine whether the event counter exceeds a threshold. In other words, the system determines whether the event counter exceeds a predetermined number of times and an over-voltage situation of the output has occurred.

When the event counter is equal to or less than the threshold, the system returns to step 1401. On the contrary, when the event counter exceeds the threshold, the system proceeds to step 1411 to shut down the system. According to an exemplary embodiment of the present invention, the system may shut down only the supply modulator.

Figure 15:
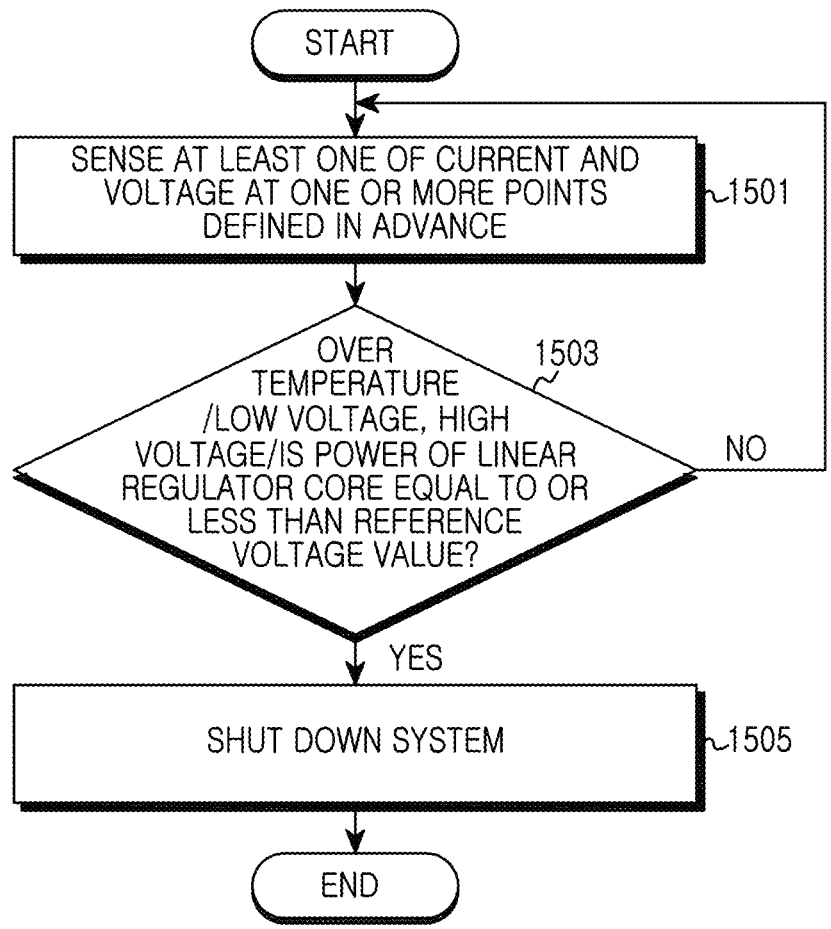
FIG. 15 is a flowchart illustrating a protection procedure from an in-current, over-temperature, a battery low voltage/high voltage during an operation of a supply modulator according to an exemplary embodiment of the present invention.

FIG. 15 is a flowchart illustrating a protection procedure from an in-current, over-temperature, a battery low voltage/high voltage during an operation of a supply modulator according to an exemplary embodiment of the present invention.

Referring to FIG. 15, a system senses at least one of a current and a voltage at one or more points defined in advance during a normal operation of the supply modulator in step 1501. For this purpose, the supply modulator of the system may have at least one of a current sensor and a voltage sensor.

Subsequently, the system proceeds to step 1503 to determine whether at least one of over-temperature, battery low voltage/high voltage, droppage of power of the linear regulator core to a reference voltage value or less occurs using the sensing result. To determine whether over-temperature occurs, the supply modulator may have a temperature sensor. To determine the battery low voltage/high voltage, the supply modulator may have a battery sensor. To sense a voltage of the power of the linear regulator core, the supply modulator may have a voltage sensor connected to the power of the linear regulator core.

When at least one of over-temperature, battery low voltage/high voltage, droppage of power of a linear regulator core to the reference voltage value or less occurs, the system proceeds to step 1505 to shut down the system. According to an exemplary embodiment of the present invention, the system may shut down only the supply modulator. However, though not illustrated in FIG. 15, the system may provide a free wheeling path for free wheeling of a remnant current inside the supply modulator for a predetermined time.

The operations for recognizing over-stress of the supply modulator and protecting the supply modulator described with reference to FIGS. 11 to 15 may be implemented separately, and at least two procedures may be implemented simultaneously. In the case where all of the procedures of FIGS. 11 to 15 are performed, the procedure of FIG. 11 is performed when system power is initially applied. After that, the procedures of FIGS. 12 to 15 are performed in parallel, respectively, while the supply modulator operates.

Figure 16:
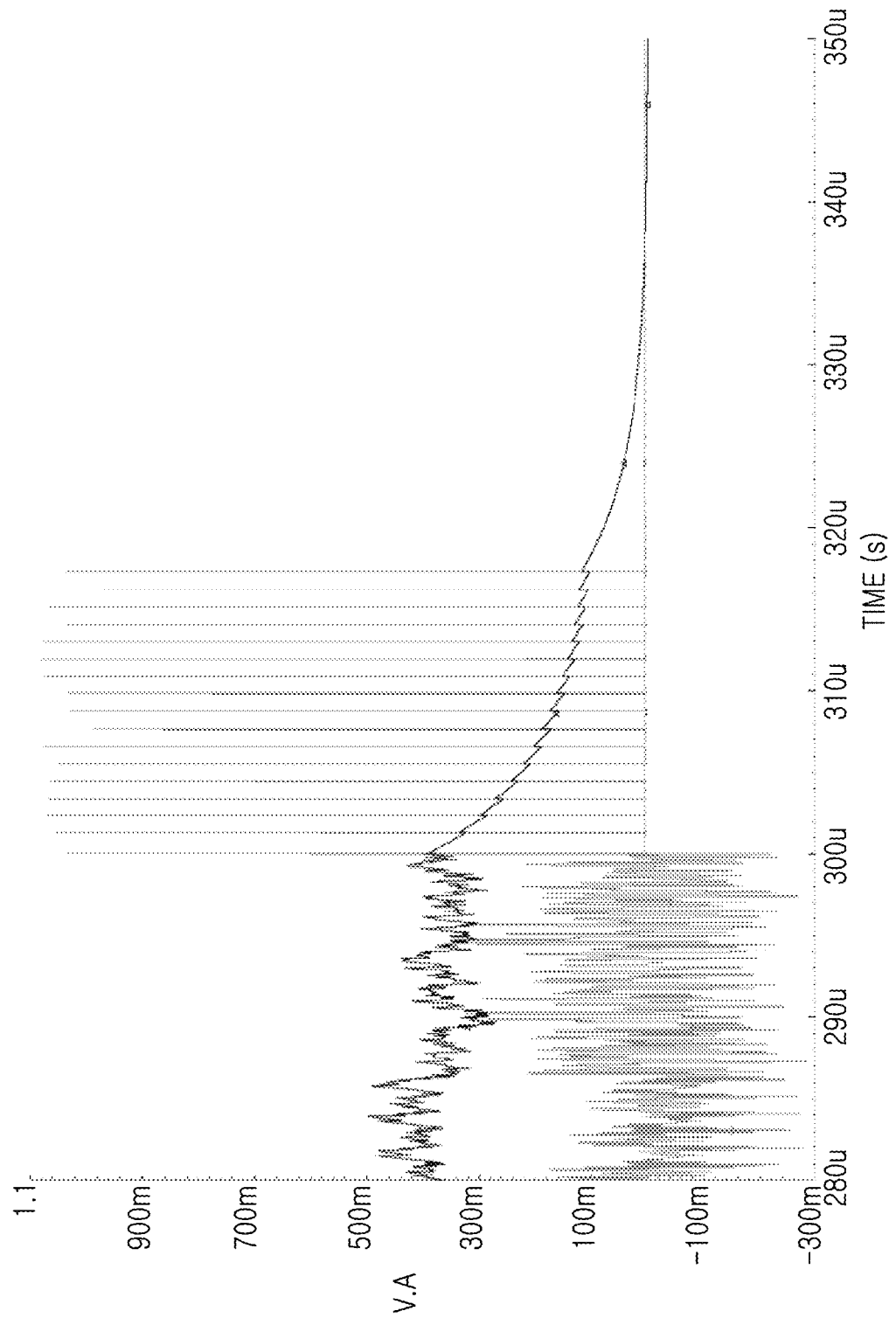
FIG. 16 is a graph illustrating a current waveform of a hybrid supply modulator according to an exemplary embodiment of the present invention.

FIG. 16 is a graph illustrating a current waveform of a hybrid supply modulator according to an exemplary embodiment of the present invention.

Referring to FIG. 16, results obtained by simulating the supply modulator of the structure of FIG. 4 are illustrated. In the simulation, it is assumed that a case where a short-load occurs while power is modulated using amplitude information of a Long Term Evolution (LTE) 10 MHz signal. A black waveform represents an amount supplied by the SMPS core among a current supplied to a load, and a gray waveform represents an amount supplied by the linear regulator core among a current supplied to the load.

Referring to FIG. 16, a current of the linear regulator core reacts fastest to a load short-circuit that has occurred at a point of about 300 μs and outputs an over-current of a magnitude of about 1 A, and an over-current from the linear regulator core has been shut off by pull-up of the gate of the upper pass transistor Mp. When a current of the linear regulator core is shut off, the upper side switch device is also maintained at an off-state, so that a current supply from the SMPS core has been shut off. However, a remnant SMPS current gradually reduces due to free wheeling of the lower side switch device. After that, when a gate pull-up of the upper pass transistor Mp is released, the over-current is output again from the linear regulator core, and the rest of the processes are repeated. Each process is repeated at a short period of about 1.5 μs, and a pulse over-current output from the linear regulator core has appeared in succession by sixteen times repeatedly. Due to repeated occurrence of an over-current situation, a gate of the upper pass transistor Mp has been permanently pulled-up, and the upper side switch device has been also turned off permanently. Therefore, the supply modulator has been shut down.

The exemplary embodiments of the present invention propose a structure for recognizing electric over-stress situations originated from special characteristics of a hybrid supply modulator, and protecting a network from the electric over-stress, thereby providing a basis of a safety apparatus indispensably required when the supply modulator is mass-produced. By applying a technique according to the exemplary embodiments of the present invention, damage that can be given to the supply modulator can be shut off or minimized with respect to most of the abnormal situations that can occur during an operation of a mobile terminal.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A hybrid supply modulator apparatus, the apparatus comprising:
   a switching mode power supplier (SMPS) for generating a current of a modulated power signal;
   a linear regulator for generating a sourcing current for supplementing a shortage amount of a current generated by the SMPS and generating a sinking current for removing an excessive amount of the current;
   at least one sensing unit configured to sense at least one of a current and a voltage at one or more points defined in advance within a circuit of the hybrid supply modulator; and
   at least one actuator unit configured to perform a protection action corresponding to at least one electric over-stress situation represented by the sensing result.

2. The apparatus of claim 1, wherein the at least one electric over-stress situation comprises at least one of an in-rush current situation in which power of the SMPS flows toward power of the linear regulator core, an excessive current situation by load short-circuit of a load connected to an output terminal of the supply modulator, an excessive current situation by a load open of the load connected to the output terminal of the supply modulator, an excessive voltage situation of an output of the supply modulator, an over temperature situation, and a battery low voltage/high voltage situation.

3. The apparatus of claim 2, wherein the at least one sensing unit recognizes the in-rush current situation by sensing a voltage of a power for the linear regulator.

4. The apparatus of claim 3, wherein the at least one actuator unit causes the supply modulator to be in an off-state until the voltage of the power for the linear regulator reaches a reference voltage value after system power is applied.

5. The apparatus of claim 4, wherein the at least one actuator unit shuts off a current flow of at least one transistor through which the in-rush current passes until the voltage of the power for the linear regulator reaches the reference voltage value after the system power is applied.

6. The apparatus of claim 5, wherein the at least one transistor comprises at least one of a transistor connected to the power of the linear regulator, and a switch transistor connected to the power of the SMPS.

7. The apparatus of claim 4, wherein the reference voltage value comprises a voltage of a power for the SMPS.

8. The apparatus of claim 2, wherein the at least one sensing unit recognizes an over-current situation by the load short-circuit by sensing a current flowing through a transistor connected to power of the linear regulator.

9. The apparatus of claim 8, wherein, when the current flowing through the transistor exceeds an over-current reference value, the at least one actuator unit shuts off the current flowing through the transistor.

10. The apparatus of claim 8, wherein, when the current flowing through the transistor exceeds an over-current reference value, the at least one actuator unit turns off a switch transistor connected to power of the SMPS.

11. The apparatus of claim 2, wherein the at least one sensing unit recognizes an over-current situation by the load open by sensing a current flowing through a transistor connected between an output terminal of the linear regulator and a ground.

12. The apparatus of claim 11, wherein, when the current flowing through the transistor exceeds an over-current reference value, the at least one actuator activates a bypass path that bypasses the output terminal and the ground.

13. The apparatus of claim 2, wherein the at least one sensing unit recognizes the over-voltage situation by sensing a voltage of an output terminal of the supply modulator.

14. The apparatus of claim 13, wherein, when the voltage of the output terminal exceeds an over-voltage reference value, the at least one actuator unit turns off a switch transistor connected to power of the SMPS.

15. The apparatus of claim 13, wherein, when the voltage of the output terminal exceeds an over-voltage reference value, the at least one actuator unit shuts off a current flowing through a transistor connected to power of the linear regulator.

16. The apparatus of claim 2, wherein, when the at least one stress situation repeatedly occurs by a predetermined number of times, the at least one actuator unit shuts down the supply modulator.

17. The apparatus of claim 1, further comprising:
a logic unit configured to generate a command logic signal corresponding to a sensing result of the at least one sensing unit; and
a buffer unit configured to convert the command logic signal to a signal of an electric level recognizable by the at least one actuator unit.

18. A method for operating a hybrid supply modulator including a switching mode power supplier (SMPS) for generating a current of a modulated power signal and a linear regulator for generating a sourcing current for supplementing a shortage amount of a current generated by the SMPS and generating a sinking current for removing an excessive amount of the current, the method comprising:
sensing at least one of a current and a voltage at one or more points defined in advance within a circuit of the hybrid supply modulator; and
performing a protection action corresponding to at least one electric over-stress situation represented by the sensing result.

19. The method of claim 18, wherein the at least one electric over-stress situation comprises at least one of an in-rush current situation in which power of the SMPS flows toward power of the linear regulator core, an excessive current situation by load short-circuit of a load connected to an output terminal of the supply modulator, an excessive current situation by a load open of the load connected to the output terminal of the supply modulator, an excessive voltage situation of an output of the supply modulator, an over temperature situation, and a battery low voltage/high voltage situation.

20. The method of claim 19, wherein the sensing of the at least one of the current and the voltage at the one or more points defined in advance comprises:
recognizing the in-rush current situation by sensing a voltage of a power for the linear regulator.

21. The method of claim 20, wherein the at least one actuator unit causes the supply modulator to be in an off-state until the voltage of the power for the linear regulator reaches a reference voltage value after system power is applied.

22. The method of claim 21, wherein the performing of the protection action comprises shutting off a current flow of at least one transistor through which the in-rush current passes until the voltage of the power for the linear regulator reaches the reference voltage value after the system power is applied.

23. The method of claim 22, wherein the at least one transistor comprises at least one of a transistor connected to the power of the linear regulator, and a switch transistor connected to the power of the SMPS.

24. The method of claim 22, wherein the reference voltage value comprises a voltage of a power for the SMPS.

25. The method of claim 19, wherein the sensing of the at least one of the current and the voltage at the one or more points defined in advance comprises:
recognizing an over-current situation by the load short-circuit by sensing a current flowing through a transistor connected to power of the linear regulator.

26. The method of claim 25, wherein the performing of the protection action comprises, when the current flowing through the transistor exceeds an over-current reference value, shutting off the current flowing through the transistor.

27. The method of claim 25, wherein the performing of the protection action comprises, when the current flowing through the transistor exceeds an over-current reference value, turning off a switch transistor connected to power of the SMPS.

28. The method of claim 19, wherein the sensing of the at least one of the current and the voltage at the one or more points defined in advance comprises:
recognizing an over-current situation by the load open by sensing a current flowing through a transistor connected between an output terminal of the linear regulator and a ground.

29. The method of claim 28, wherein the performing of the protection action comprises, when the current flowing through the transistor exceeds an over-current reference value, activating a bypass path that bypasses the output terminal and the ground.

30. The method of claim 19, wherein the sensing of the at least one of the current and the voltage at the one or more points defined in advance comprises:
recognizing the over-voltage situation by sensing a voltage of an output terminal of the supply modulator.

31. The method of claim 30, wherein the performing of the protection action comprises, when the voltage of the output terminal exceeds an over-voltage reference value, turning off a switch transistor connected to power of the SMPS.

32. The method of claim 30, wherein the performing of the protection action comprises, when the voltage of the output terminal exceeds an over-voltage reference value, shutting off a current flowing through a transistor connected to power of the linear regulator.

33. The method of claim 19, wherein the performing of the protection action comprises, when the at least one stress situation repeatedly occurs by a predetermined number of times, shutting down the supply modulator.

34. The method of claim 18, further comprising:
generating a command logic signal corresponding to a sensing result of at least one sensing unit; and
converting the command logic signal to a signal of an electric level recognizable by at least one actuator unit.

35. The apparatus of claim 1, wherein the protection action comprises at least one of shutting off a current flow of at least one transistor in the supply modulator, turning off the at least one transistor in the supply modulator, activating a bypass path between an output terminal of the supply modulator and a ground, and shutting down the supply modulator.

36. The method of claim 18, wherein the protection action comprises at least one of shutting off a current flow of at least one transistor in the supply modulator, turning off the at least one transistor in the supply modulator, activating a bypass path between an output terminal of the supply modulator and a ground, and shutting down the supply modulator.

* * * * *